(12) United States Patent
Degioanni

(10) Patent No.: US 11,288,075 B2
(45) Date of Patent: Mar. 29, 2022

(54) DYNAMIC INSTRUMENTATION VIA USER-LEVEL MECHANISMS

(71) Applicant: Sysdig, Inc., San Francisco, CA (US)

(72) Inventor: Loris Degioanni, San Francisco, CA (US)

(73) Assignee: SYSDIG, INC., San Francisco, CA (US)

( * ) Notice: Subject to any disclaimer, the term of this patent is extended or adjusted under 35 U.S.C. 154(b) by 0 days.

(21) Appl. No.: 17/214,558

(22) Filed: Mar. 26, 2021

(65) Prior Publication Data

US 2021/0303312 A1    Sep. 30, 2021

Related U.S. Application Data

(60) Provisional application No. 63/001,167, filed on Mar. 27, 2020.

(51) Int. Cl.
| | |
|---|---|
| *G06F 9/38* | (2018.01) |
| *G06F 9/30* | (2018.01) |
| *G06F 9/32* | (2018.01) |
| *G06F 9/445* | (2018.01) |

(52) U.S. Cl.
CPC .......... *G06F 9/3865* (2013.01); *G06F 9/3005* (2013.01); *G06F 9/30043* (2013.01); *G06F 9/32* (2013.01); *G06F 9/44521* (2013.01)

(58) Field of Classification Search
CPC .................................................... G06F 9/3865
See application file for complete search history.

(56) References Cited

U.S. PATENT DOCUMENTS

| | | | | |
|---|---|---|---|---|
| 6,026,235 A | * | 2/2000 | Shaughnessy ...... | G06F 11/3466 714/E11.2 |
| 6,370,639 B1 | * | 4/2002 | Huck .................. | G06F 9/30094 712/222 |
| 2015/0120985 A1 | * | 4/2015 | Frey .................... | G06F 12/1009 711/6 |

OTHER PUBLICATIONS

International Searching Authority, "Search Report", in "Country" Application No. PCT/US2021/024526, dated Jul. 29, 2021, 13 pages.

(Continued)

*Primary Examiner* — Michael J Metzger
(74) *Attorney, Agent, or Firm* — Hickman Becker Bingham Ledesma LLP

(57) ABSTRACT

In one embodiment, a method includes accessing a loaded but paused source process executable and disassembling the source process executable to identify a system call to be instrumented and an adjacent relocatable instruction. Instrumenting the system call includes building a trampoline for the system call that includes a check flag instruction at or near an entry point to the trampoline and two areas of the trampoline that are selectively executed according to results of the check flag instruction. Building a first area of the trampoline includes providing instructions to execute a relocated copy of the adjacent relocatable instruction and return flow to an address immediately following the adjacent relocatable instruction. Building a second area of the trampoline includes providing instructions to invoke at least one handler associated with executing a relocated copy of the system call and return flow to an address immediately following the system call.

20 Claims, 13 Drawing Sheets

(56) References Cited

OTHER PUBLICATIONS

Hunt, Galen, et al., "Detours: Binary Interception of WIN32 Functions", published in Proceedings of the 3rd USENIX Windows NT Symp, the Advanced Sys Assoctn Jul. 12, 1999,, pp. 1-10, Jul. 22, 1999, 10pgs.

Hosek, Petr P., et al., "VARAN the Unbelievable", An Efficient N-version Execution Framework, ACM Sigarch Comp. Architecture News, ACM Special Interest Grp on Comp Arch, ASPLOS '15, vol. 43, No. 1, Mar. 14, 2015, 16pgs.

\* cited by examiner

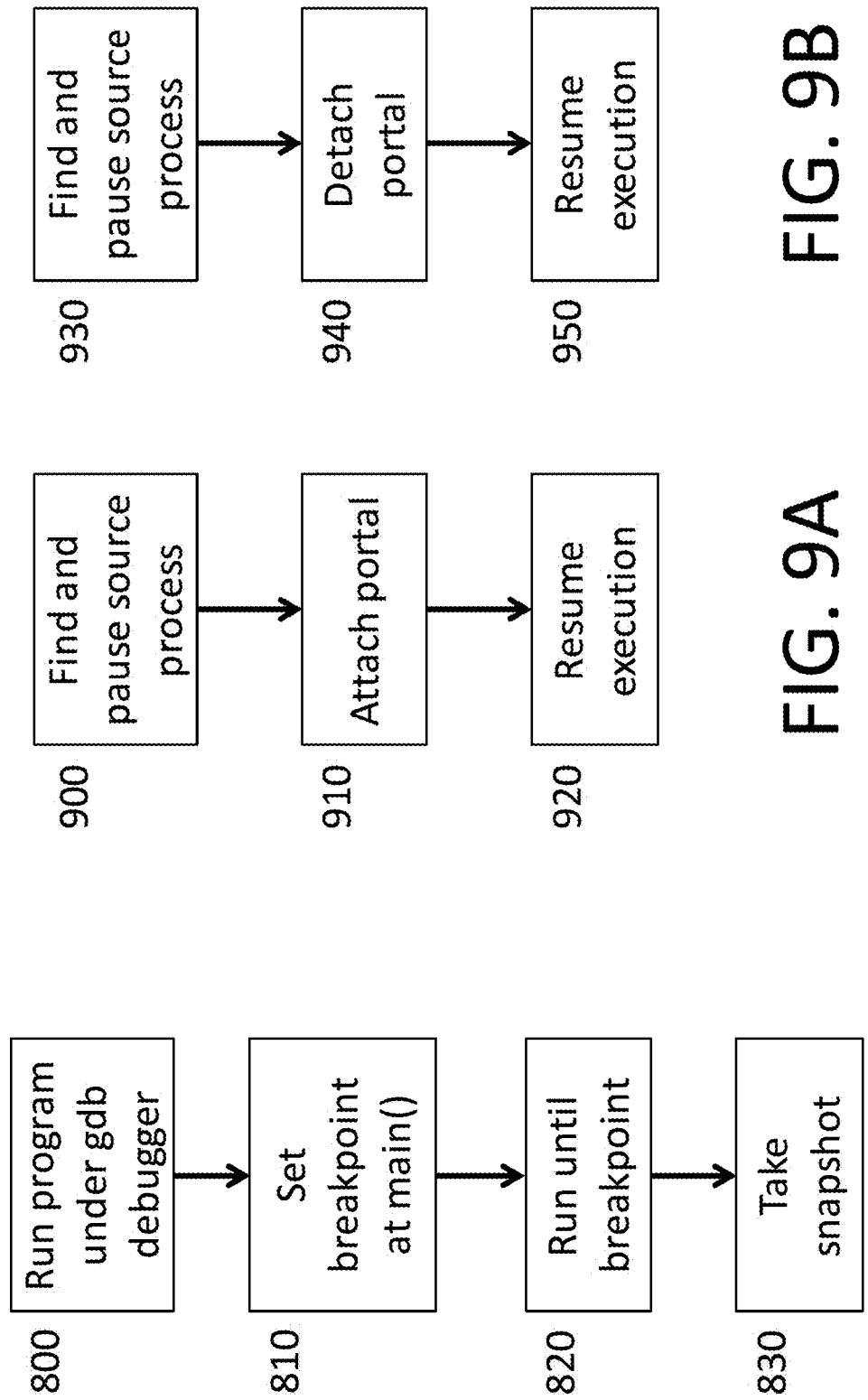

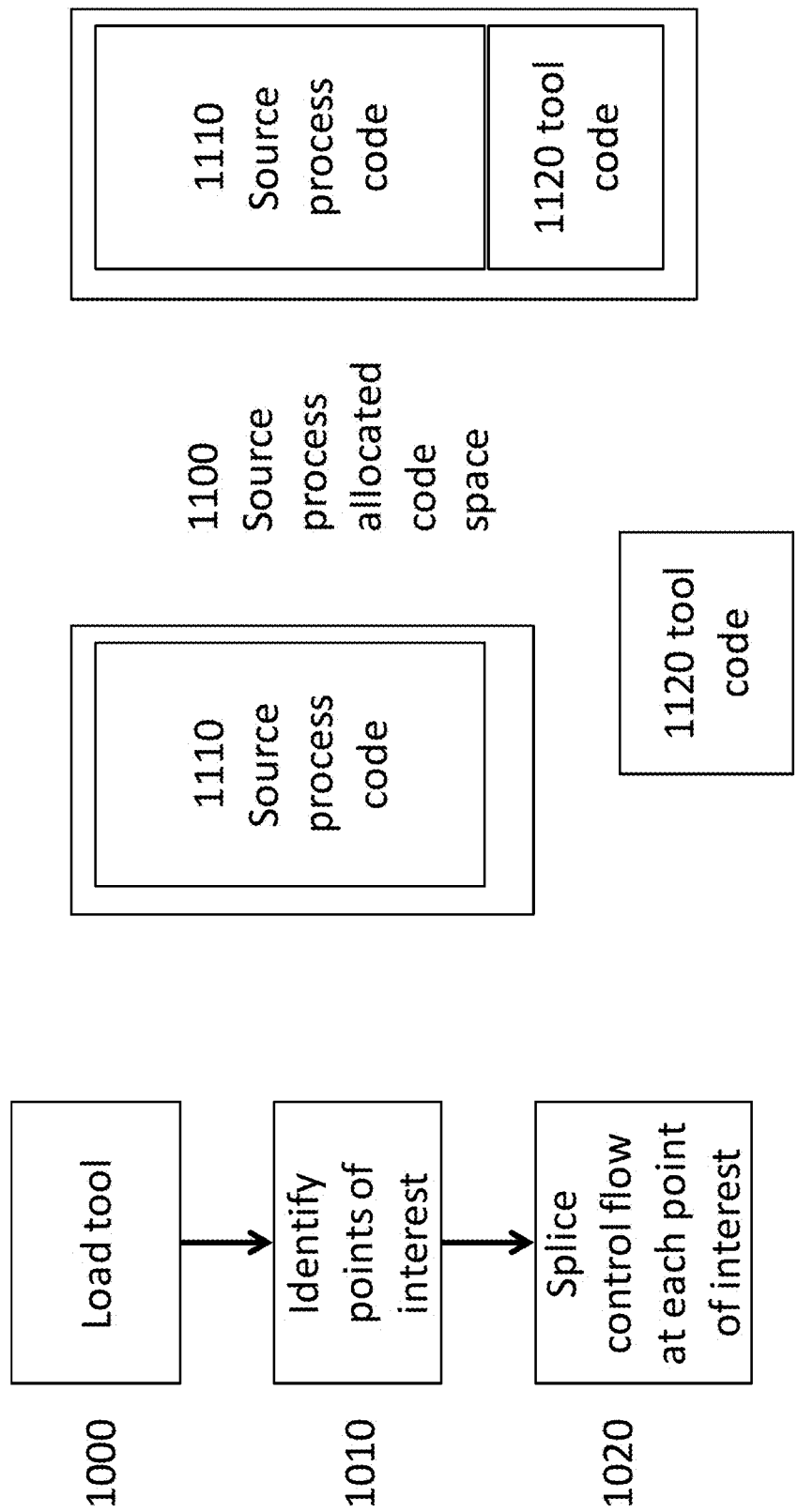

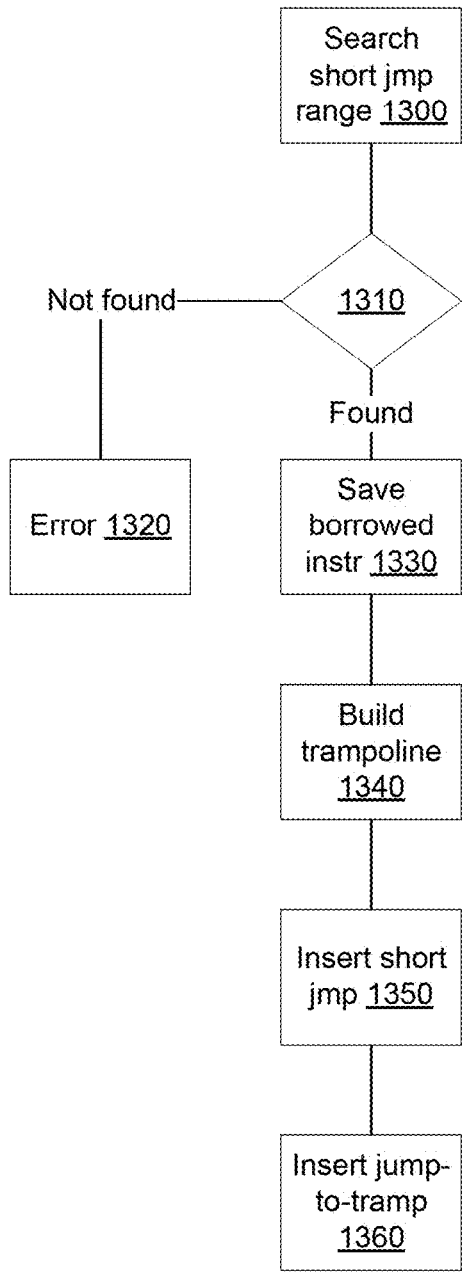
FIG. 13
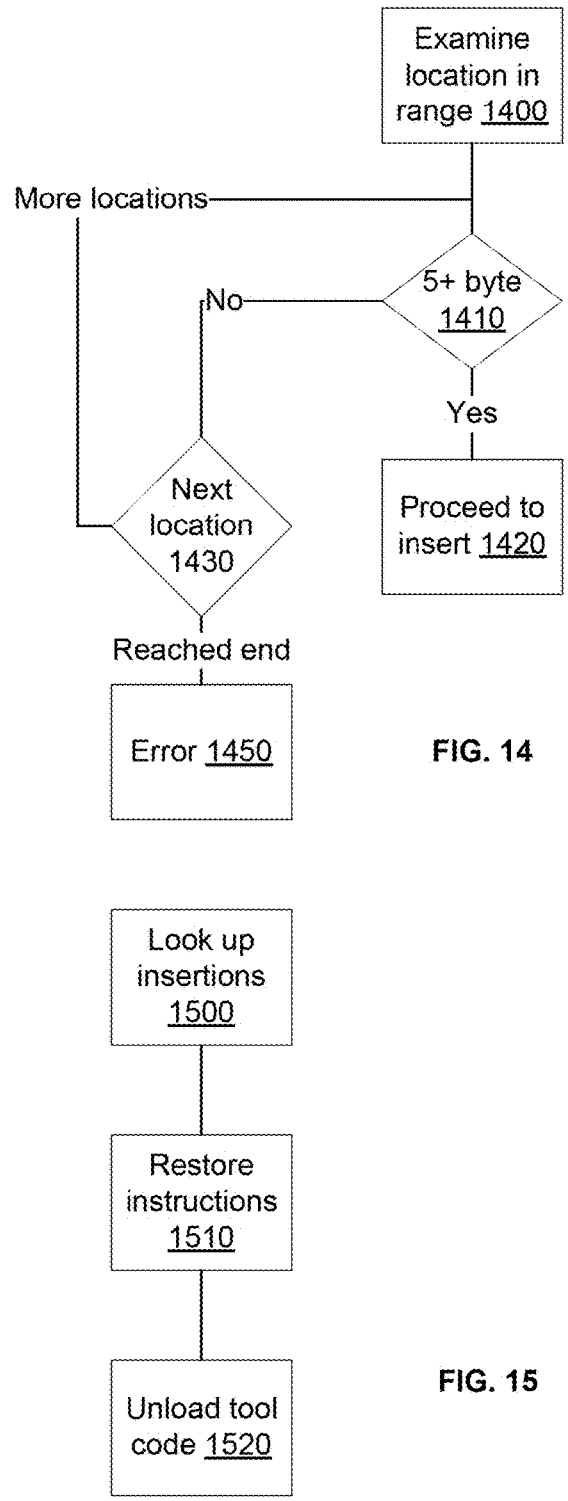
FIG. 14
FIG. 15

DYNAMIC INSTRUMENTATION VIA USER-LEVEL MECHANISMS

BACKGROUND

The technology disclosed relates to instrumentation of source processes, after being loaded by an operating system for execution. Source processes call target processes, which may include system calls, kernel calls and internal function calls. Instrumentation of source processes is useful for performance evaluation and forensics, especially when corresponding program code and even symbol tables are unavailable. It also can be useful for debugging.

An opportunity arises to instrument source processes that call target processes, as opposed to instrumenting the target processes or redirecting calls to the target processes. Better, more easily operated, more flexible investigation systems may result.

SUMMARY

In one implementation, the technology disclosed can be practiced as a method of instrumenting a source process that calls target processes. This method includes accessing a loaded but paused source process executable and disassembling the source process executable to identify at least some system calls to be instrumented and, for a respective system call, at least one adjacent relocatable instruction. Techniques are described herein as applying the method to a single respective system call, with the understanding that a plurality of system calls are instrumented. Instrumenting the respective system call includes building a trampoline for a respective system call that includes a check flag instruction at or near an entry point to the trampoline and two areas of the trampoline that are selectively executed according to results of the check flag instruction. Building a first area of the trampoline, in turn, includes providing instructions to execute a relocated copy of the adjacent relocatable instruction and return flow to an address immediately following the adjacent relocatable instruction. Building a second area of the trampoline includes providing instructions to invoke at least one handler before and/or after executing a relocated copy of the respective system call and return flow to an address immediately following the respective system call.

Instrumenting the respective system call further includes overwriting the respective system call and the adjacent relocatable instruction. The adjacent relocatable instruction is overwritten with at least a set flag instruction and a jump-to-trampoline instruction. The system call is overwritten with a jump instruction directed to the jump-to-trampoline instruction, forming a jump sequence that produces a different state of the flag when flow jumps from the system call than when flow proceeds sequentially to the jump-to-trampoline instruction. A variety of instruction sequences are available to produce different flag states depending on how the execution flow reaches the jump-to-trampoline instruction, which are reiterated below. Common to the alternative sequences, the jump-to-trampoline instruction is executed along both flow paths.

The method further includes causing execution of the source process executable with the trampoline operable to instrument the system calls. Results of instrumentation can be collected and can be filtered and/or aggregated for reporting to a user or a subsequent task in a workflow.

Particular aspects and features of the technology disclosed are described in the claims, specification and drawings. A number of special use cases are addressed.

BRIEF DESCRIPTION OF THE DRAWINGS

FIG. 8 illustrates an example flow that includes the use of a debugger to prepare handlers used for instrumentation that do not rely on dynamically linked libraries.
FIG. 9A illustrates an example flow of the instrumentation tool attaching to and detaching from a source process executable.
FIG. 9B illustrates an example flow of the instrumentation tool attaching to and detaching from a source process executable.
FIG. 10 illustrates an example flow for attaching handler(s).
FIG. 11A illustrates the steps involved in attaching handler(s)
FIG. 11B illustrates the steps involved in attaching handler(s).
FIG. 13 illustrates an example flow for splicing code to instrument a single point of interest and redirecting flow to a trampoline at a known address.
FIG. 14 illustrates steps that can be taken to find a suitable location to borrow.
FIG. 15 illustrates steps that can be taken to reverse instrumentation of the source process.

DETAILED DESCRIPTION

Figure 1B:
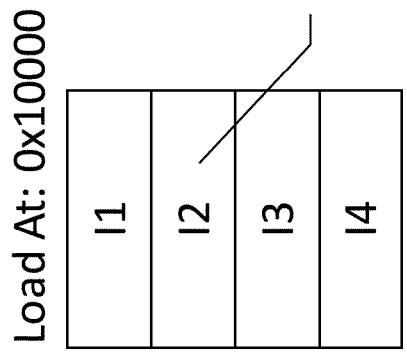
FIG. 1B illustrates a kind of code unit.

The following detailed description is made with reference to the figures. Example implementations are described to illustrate the technology disclosed, not to limit its scope, which is defined by the claims. Those of ordinary skill in the art will recognize a variety of equivalent variations on the description that follows.

INTRODUCTION

There are many situations in which the behavior and detailed actions of a running process are of interest. Security personnel may need to investigate an unknown process. Operators (i.e., persons responsible for the running of the process) may be interested in troubleshooting the process's behavior under particular circumstances, or they may be interested in examining the process's behavior under a wide variety of workloads. Programmers may be interested to understand how they can fix errors or improve performance of the process. It will be apparent to those skilled in the art that there are many additional circumstances in which it is helpful to be able to understand aspects of the internal operation of a running process.

It is useful to distinguish between an uninstrumented or ordinary process that does not expose these operational characteristics, and an instrumented process that does expose some of this information. In this disclosure, "instrumentation" refers to changes made to a loaded process and one or more handler(s) invoked by those changes that expose operational characteristics. The term "instrumentation tool" or "instrumentation activity" refers to a process or system that supports dynamic instrumentation of the running process. The running process to be instrumented is referred to as the "source process," and can be distinguished from a target process that is called by the source process.

A fundamental distinction in modern operating systems is between kernel and user. "Kernel" refers to code, data structures, and features that are available to the operating system itself, while "user" refers to code, data structures, and features that are available to the users of the operating system. These terms are sometimes used to refer to spaces or domains, as in "user space" or "kernel domain."

This distinction can be significant for trust and the integrity of the operating system. To protect the integrity of the shared system against deliberate or accidental attacks (e.g., those caused by various kinds of programming errors), the operating system and hardware disallow certain kinds of activity or access by user programs. An alternate way of summarizing the situation is to say that user programs are not trusted. Instead, certain critical facilities are available only to the operating system itself; the operating system alone is trusted to have access to those particular facilities.

Consistent with kernel security, one approach to instrumenting target processes has involved modifying targeted library processes. It is possible in Linux, for instance, to modify the program's environment so that an instrumented variation on libc or another library is loaded from a special place. In Linux, the environment variable LD PRELOAD can be used to cause loading of an instrumented substitute library, instead of the usual library. This approach has various limitations. First, it is only possible to perform this kind of modification when the process is being started; this approach is not workable for instrumenting an already-running process. Second, this approach only provides instrumentation for programs that use the specific library that has been modified, and it only provides instrumentation of the calls in that library. For example, if libc is the instrumented library, and the source program does not use libc; or uses libc, but the activity of interest uses no libc calls, then this approach does not actually provide any useful instrumentation of the source process behavior. Finally, the instrumentation has only the privileges of the source process in user mode, which may limit its ability to provide crucial kernel-level information about the process.

Another approach to instrumenting target processes is to use kernel facilities like the Linux ptrace. Ptrace is a system call that allows one process to observe or modify the state and behavior of another process, implicitly using kernel facilities to overcome the default separation between user processes. On any given machine running an operating system that supports ptrace, ptrace may be disabled as a security best practice. On a machine where ptrace is disabled, it may not be possible to enable ptrace. If ptrace is not and cannot be enabled, then any ptrace-based instrumentation will not be usable.

In some embodiments, the instrumentation technology disclosed includes an instrumentation tool that attaches instrumentation to a loaded source process. This may involve loading handlers that can be invoked to instrument processing, building a trampoline that mediates between the handlers and the source process, and modifying instruction bytes in the source process to redirect flow via the trampoline to the handlers. Instructions in the source process are modified by the instrumentation tool both to replace borrowed instruction bytes with a jump-to-trampoline instruction and to replace instrumented system calls with jump sequences that redirect execution flow via the jump-to-trampoline instruction, to the trampoline and handler, then back again. The trampoline holds two areas of instructions for each instrumented system call. A first area replicates the borrowed instruction bytes, so the borrowed instruction is executed as if the bytes had not been overwritten. A second area applies instrumentation, such as calls to handler(s) before and/or after executing the instrumented system call. Both areas are reached via a single entry point onto the trampoline. The trampoline's code distinguishes between flows reaching the entry point by sensing a bit flag that distinguishes between the sequential flow over the borrowed instruction and the instrumented system call. Flow returns from the trampoline to an address in the source process executable that takes into account the flow path onto the trampoline.

In some embodiments, a settable flag that can be used distinguish between the flows that reach the jump-to-trampoline, on the Intel x86 architecture, is the direction flag, which is bit 10 in the FLAGS register. This flag is set by the STD instruction and cleared by the CLD instruction. The flag is not used to convey information across call/return boundaries, as indicated in the "Direction Flag" section of "Calling conventions for different C++ compilers and operating systems" by Agner Fog of Technical University of Denmark. The aforementioned document is incorporated by reference into this application.

In some embodiments, system calls can be located reliably by disassembly, more reliably than function calls generally. The technology disclosed includes disassembling a loaded executable to locate system call instructions. In processor instruction sets, there are instructions such as "SYSCALL" or "sysenter" that are used exclusively to invoke system routines. They sometimes are referred to as fast system calls because the instructions are only two bytes and can be invoked following minimal loading of registers to identify the desired system call. The system calls to be instrumented can reliably be filtered based on the register loading proximate to each system call. In contrast, the jump instructions used to invoke functions can have multiple uses, such as for an iterator or case statement. General function calls are more difficult to reliably identify, at least without an all-inclusive symbol table. A downside of instrumenting system calls is the short instructions.

Two-byte op codes used for system calls present the challenge of inadequate code space in which to insert a jump-to-trampoline instruction. In some embodiments, the system call op code can only be replaced by a short jump. Use of a short jump causes jumps to be inserted into two borrowed instructions, not just one. In turn, two areas in the trampoline are needed to execute both of the borrowed instructions.

In some embodiments, instrumentation of system calls is essentially the same whether the instructions are inline or invoked via wrappers in a library, such a Linux library. Once the library is loaded, the system calls within wrappers are instrumented just as inline system calls would be.

In some embodiments, an alternative use case involves multiple short jumps and additional areas on the trampoline. If a single short jump is not enough to reach a borrowed instruction that can hold a jump-to-trampoline, then multiple short jumps can be used.

In some embodiments, another alternative use case involves unused space in an executable, such as at a boundary between modules. In this use case, the borrowed space is sometimes filled with a background memory fill pattern. Disassembly of the executable module can establish that the unused space is not reached by either sequential flows or jumps. When unused space is reachable in a single short jump, the jump-to-trampoline need not overwrite an instruction, so one area on the trampoline is sufficient. If the unused space cannot be reached in normal program flow, the instruction to set the direction flag can be omitted and only one area of the trampoline, for the instrumentation, needs to be built. The entry instruction on the trampoline that checks the direction flag also can be omitted.

In some embodiments, a variation on unused space involves a SYSCALL instruction prefaced by set up instructions or followed by recognized instructions, not targeted by any jump, that can be grouped with the SYSCALL instruction to make sufficient room for a jump-to-trampoline instruction, eliminating the need for a short jump to borrowed or empty space. Disassembly can reveal availability of contiguous instruction space in the executable, preceding or following a SYSCALL instruction, sufficient to accommodate the jump-to-trampoline instruction without an intermediate short jump. When the trampoline is reached from an inline jump-to-trampoline instruction, one area on the trampoline is sufficient. Potentially, the instruction to set the direction flag and the corresponding instruction to check the direction flag can be omitted. Only one area of the trampoline, for the instrumentation, needs to be built.

In some embodiments, disassembly of the source process executable can produce a list of system calls available for instrumentation and can also identify the parameters applied to the system calls. The user to select system calls to instrument by filtering on values of the parameters.

Source Process Linking and Loading

In the Linux operating system, both static linking and dynamic linking are supported, with conflicting characteristics. Statically-linked code cannot be loaded at an arbitrary address. Instead, it is designed to be loaded at a particular well-known fixed address. Dynamically-linked code can be loaded at an arbitrary address, but risks triggering additional dynamic loading and linking. Dynamic linking may be present even in nominally statically-linked code. Some low-level system facilities in Linux have hidden dynamic libraries even when they are linked in statically. For example, the Name Service Switch (NSS) facility and Virtual Dynamic System Object (vDSO) facility are commonly included in the C library (libc) and will potentially cause the dynamic invocation of additional library code even when libc is linked in statically.

The source process could have been produced by many different techniques, so the instrumentation tool cannot rely on having a symbol table; even if a symbol table is present, the instrumentation tool cannot necessarily be sure of its format. In an embodiment, the instrumentation tool identifies system calls by looking for SYSCALL instructions. Rather than literally searching for the relevant byte pattern, the instrumentation tool disassembles the instructions of the source process. From the disassembled process, the instrumentation tool generates a list of addresses, each of which has an associated SYSCALL instruction and possibly associated data (such as a system call number). (See, e.g., 1240 in FIG. 12.) This list of addresses and associated data drives the subsequent hooking process.

Equipped with a list of relevant system calls and their addresses, the instrumentation tool modifies the source process so that control flow goes to the handler on entry/exit from relevant system calls. This change is effectively splicing a jump sequence to the handler into the flow of the source process. There is a corresponding un-instrumenting step can be performed when monitoring is no longer needed, in which each system call hook is removed, and the source process restored to its original condition.

Splicing the instrumentation into the control flow requires overwriting of code for system calls of interest, as well as trampolines that transfer control flow back and forth between original source-process code and handler(s).

FIGURES

Figure 1A:
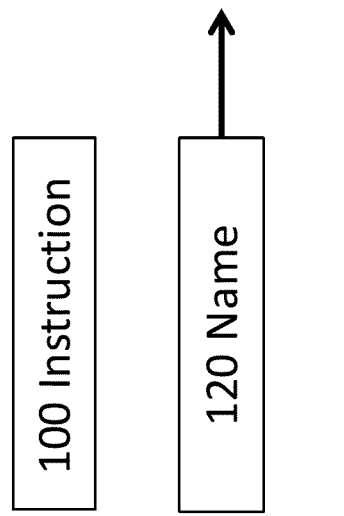
FIG. 1A illustrates a kind of code unit.
Figure 1C:
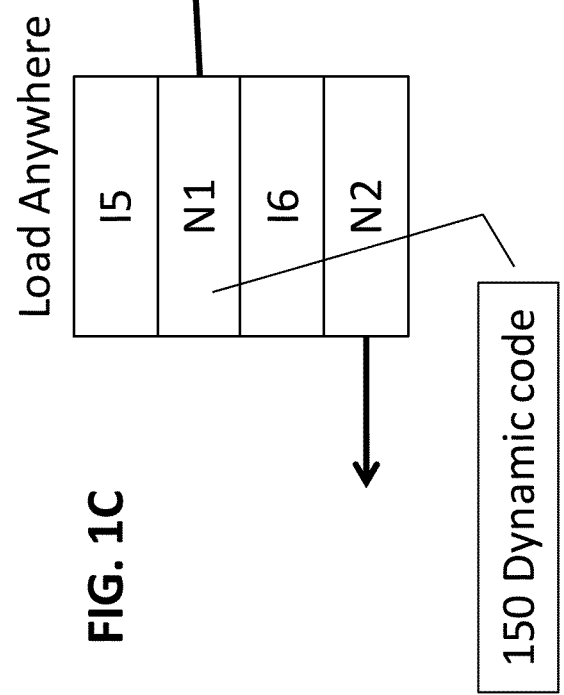
FIG. 1C illustrates a kind of code unit.

FIGS. 1A, 1B, 1C each show a different kind of code unit. FIG. 1A illustrates a single instruction 100 and a single name 120. The instruction 100 is an instruction nor other unit of execution for the computer, sometimes called as a machine instruction. The name 120 is a reference used as a target for jump or transfer statements, rather than an instruction. A name can be a parameter for an instruction, either replaced with an address or resolvable at load or run time. For simplicity, instruction 100 and name 120 are represented by the same size of block. However, different instructions 100 may have different lengths, even on a single machine. Similarly, names 120 may have a variable length. The length of an instruction 100 has no necessary relationship to the length of a name 120.

Each code snippet in FIGS. 1A, 1B and 1C has four slots, for purposes of illustration. Code refers to a collection of instructions and/or names, which may represent a complex assembly of distinct pieces. FIG. 1B illustrates statically linked code 140, also called static code, in instructions 100 have resolved addresses, identified as I1, I2, I3, I4. Instructions 100 are seldom as short as four entries. Longer sequences give useful instructions to computational machinery. In statically linked code 140, names used during program creation are resolved to addresses, either during compilation or at run time, by a linker/loader, for instance. Static linked code 140 is (mostly) guaranteed to run without triggering the system's linking loader, during execution. Because statically linked code 140 is not loaded dynamically, the linker gives it a fixed load address (in Linux, 0x100000).

FIG. 1C, in contrast, illustrates dynamically-linked code 150, also called dynamic code. Dynamically-linked code includes both instructions 100 and names 120—in this example, the names are N1 and N2. Each name 120 represents an external unit that is not (yet) included in dynamically-linked code 150. If the execution of dynamically linked code 150 proceeds in a way that requires the use of the unit named by a particular name 120, the operating system invokes the linking loader to resolve the name 120 to another specific item of dynamically-linked code 150. Because of this dynamic name resolution, dynamically-linked code 150 can be loaded at an arbitrary address in the process's address space. Examples of dynamically-linked code include dynamic link libraries (DLLs) on Microsoft Windows operating systems and shared object (.so) files on Linux operating systems.

Figure 2:
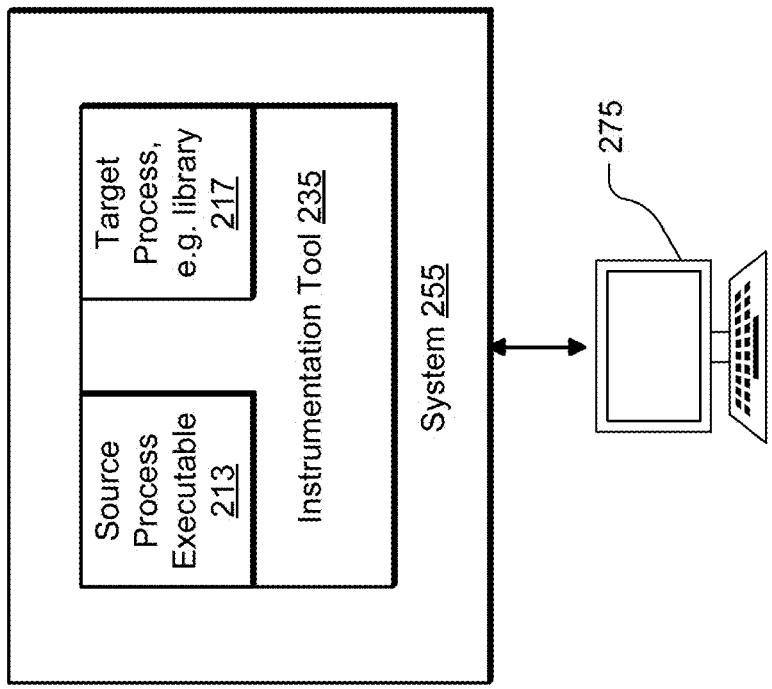
FIG. 2 illustrates a block diagram of applying an instrumentation tool to a source process executable, which calls target processes.

FIG. 2 illustrates a block diagram of applying an instrumentation tool 235 to a source process executable 213, which calls target processes 217. The instrumentation tool, source process and target processes run on a computer system 255. The user console 275 applies and takes advantage of the instrumentation tool. In this context, the source process executable is loaded on the system, as opposed to being source code interpreted by a debugger. The instrumentation tool 235 modifies the source process executable or a copy of the source process executable to intercept calls directed to target processes. Target processes are, for instance, library calls or system calls.

Figure 3:
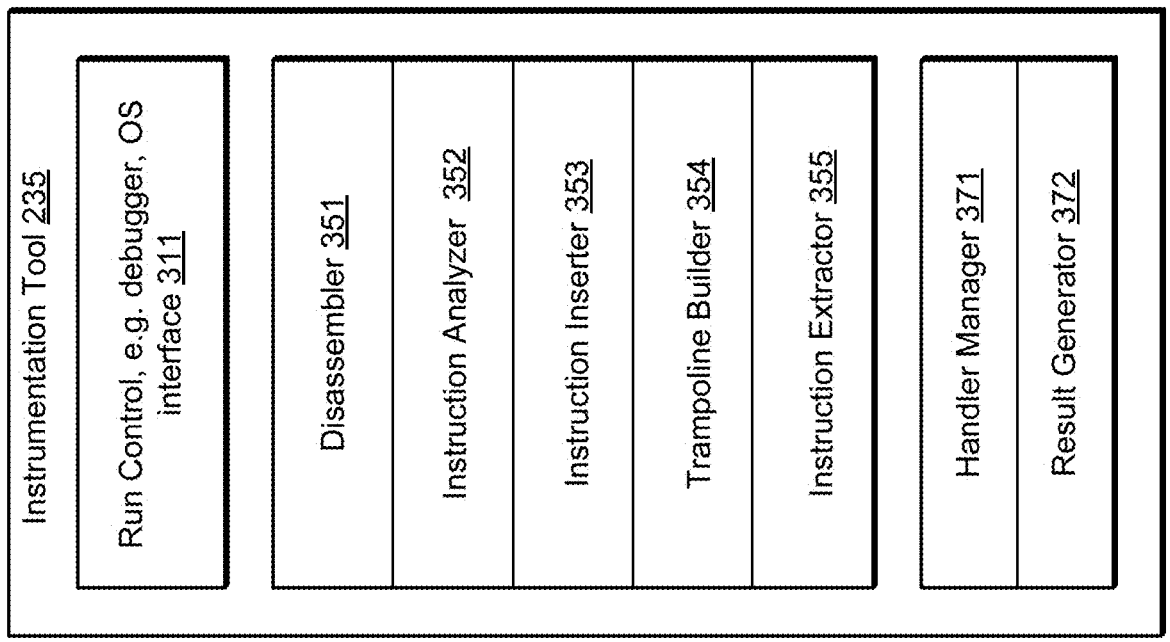
FIG. 3 illustrates a multiple component instrumental tool.

The instrumentation tool 235 has several components, illustrated in FIG. 3, which we have grouped for purposes of discussion. These groupings are not intended to constrain the architecture of any particular instrumentation tool implementation. The first group is the run control 311. Source process 213 to be instrumented is an executable, typically linked in loaded by a system linker. Some source process executables are pre-linked into a static executable, as explained above, and are merely loaded. The run control 311 at least pauses the source process executable and also may launch the executable. Debuggers, such as the Linux gdp debugger, can launch executables with a breakpoint set. These debuggers both launch and pause executables. The debugger can stop a source process at the entry point of its main routine, after the loader and the source process initialization code have had a chance to configure its memory regions and perform initializations. Using the debugger is one means of pausing the source process executable to allow the disassembler 351 to take a snapshot of its entire memory. Not shown separately, the run controller 311 can provide a user interface to filter and/or select among calls identified by the disassembler. Minimally, the run control 311 includes an operating system interface to cause execution of the running process, such as issuing a SIGSTOP signal directed to a process ID of the source process. This is an alternative means of pausing the source process. With the proper operating system privileges, the run control 311 can stop the process. It can later resume execution of the running process, such as by issuing a SIGCON signal directed to the process ID of the source process.

The second group includes components that install and remove instrumentation links, which invoke handlers. This group of components has privileges to use an operating system interface, such as the "/proc/mem" interface, to read and write the memory of the stopped source process. It includes a disassembler 351, an instruction analyzer 352, an instruction inserter 353, a trampoline builder 354 and an instruction extractor 355, which can undo operations of the instruction inserter 353.

The disassembler 351 distinguishes instructions from data and assigns an address to each instruction. The instruction analyzer 352 can analyze output of the disassembler 351 to identify both calls to be instrumented and instructions within the executable that can be borrowed for jump-to-trampoline instructions, as explained below. Some of the instructions identified as a result of disassembly will be system call instructions, e.g., SYSCALL or sysenter instructions in an Intel x86 instruction set. A list of addresses and corresponding system call instructions is sometimes referred to herein as points of interest. Some of the instructions identified for borrowing will be double word instructions, or other instructions that occupy five or more bytes. In one implementation, the resulting points of interest includes system call instructions along with their addresses in the process. In another implementation, the instrumentation tool's points of interest can be pre-filtered to include only a selection or subset of the system call instructions.

Additional details will be given for the instruction analyzer 352, the instruction inserter 353 and the trampoline builder 354, in the course of describing insertion of instructions and construction of trampoline areas, to accomplish instrumentation.

The handler manager 371 manages handlers that can be invoked from many instrumentation entry points on the trampoline. The handlers can be invoked before or after a system call. The handlers can simply count the number of invocations, itemize each invocation with a timestamp, or provide additional information such as parameters being used to invoke the system call, values returned from the system call, a location from which the system call was made, and a call stack at the time of the system call. Examples of applying handlers are given below.

The result generator 372 compiles data from the handlers. This can be done during execution, when running of the source process is paused by the run control 311, or at the conclusion of an instrumentation session. The data can be complied in a graphic display, a spreadsheet, a load file for a database or in a database. It can be raw data for aggregation in a subsequent step or it can be aggregated from itemized data collected by the handlers.

At the conclusion of an instrumentation session, the instruction extractor 355 can reverse attachment of the instrumentation tool to the source process. This can include restoring the borrowed instructions in the source process executable, removing added instructions, and removing the trampoline and handler code from the code space for the source process. Following this overview, insertion of inserted instructions and construction of the trampoline are presented.

Figures 4A, 4B:
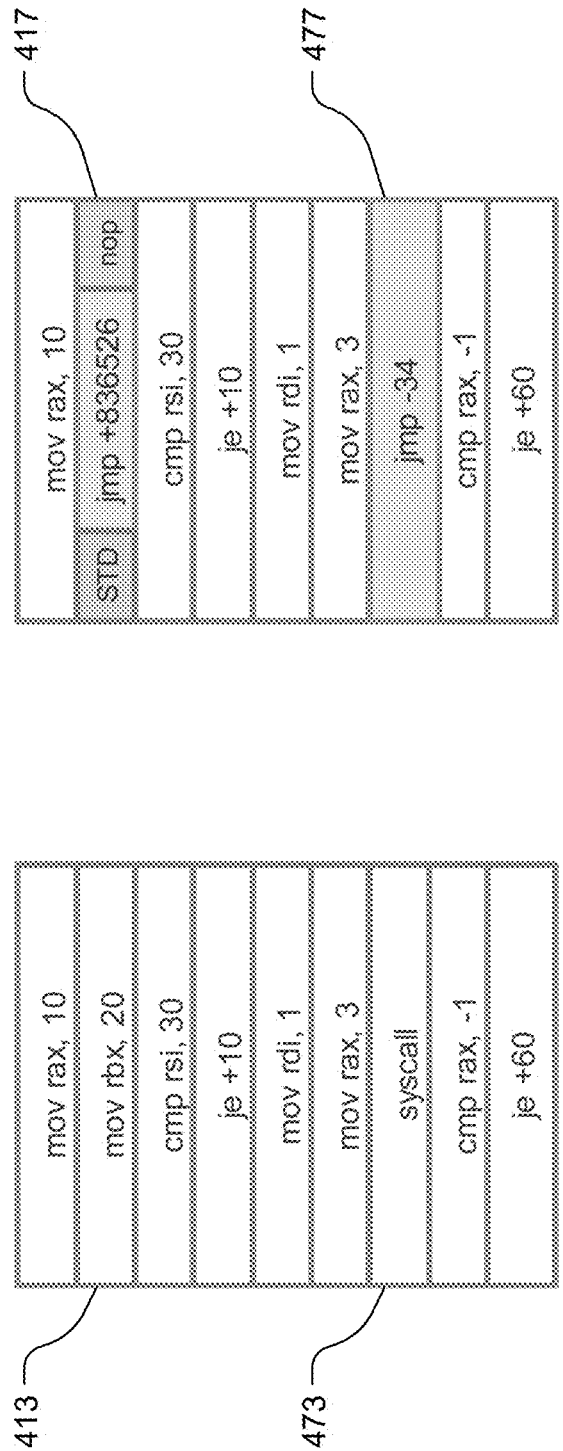
FIG. 4A illustrates inserting instructions to instrument a system call.
FIG. 4B illustrates inserting instructions to instrument a system call.

FIGS. 4A and 4B show inserting instructions to instrument a system call. In this example, a SYSCALL instruction 473 that occupies two bytes of the executable is instrumented. Instructions in the source process are modified by the instrumentation tool both to replace borrowed instruction bytes with a jump-to-trampoline instruction and to replace instrumented system calls with jump sequences that redirect execution flow to via the jump-to-trampoline instruction, to the trampoline and handler, then back again. FIG. 4A illustrates a series of instructions surrounding the system call, in mnemonics similar to Intel 64 bit assembly language. The first four instructions, including 413, build to a conditional jump that bypasses or executes a SYSCALL 473. The next five instructions, including 473, build to, execute and evaluate a return code from SYSCALL 473, which is the system call to be instrumented. FIG. 4B is an example of instruction replacements used to instrument the SYSCALL. At 417, the mov instruction 413 space is borrowed and used for a set direction flag STD instruction and a long jmp instruction that redirects flow to the trampoline. Leftover space is padded with a no-operation code. At 477, the SYSCALL instruction is replaced with a short jmp instruction, which is the same two-byte length as the SYSCALL. The short jmp destination is the jmp in 417, bypassing the STD. Thus, sequential flow sets the direction flag before jumping to the trampoline and redirected flow, from 417, does not set the direction flag. The code on the trampoline can distinguish between flows to the same entry point on the trampoline.

Figure 5:
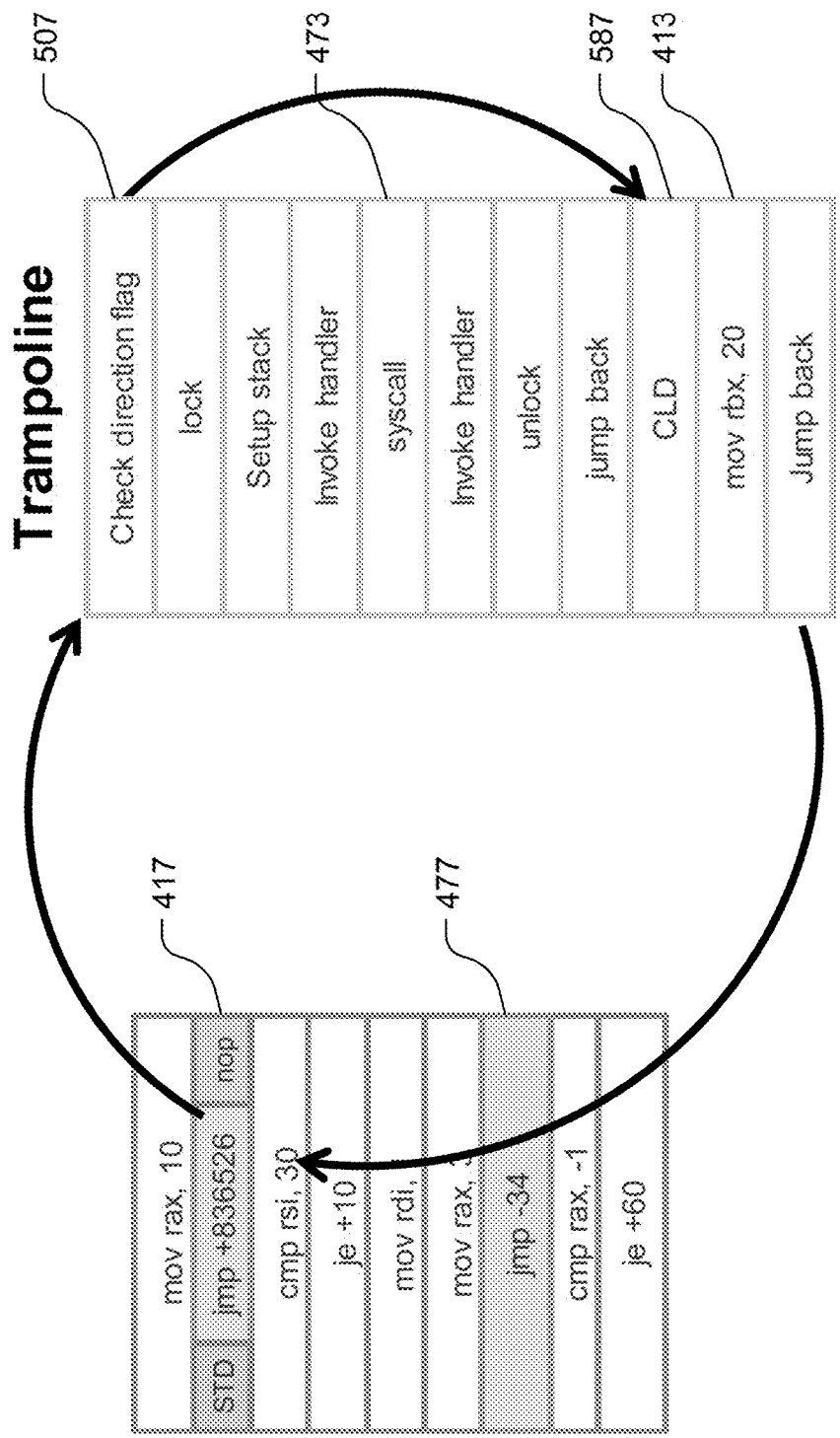
FIG. 5 illustrates an example trampoline, with a mix of mnemonics and pseudo code, which handles a sequential flow.

FIG. 5 is an example of a trampoline, with a mix of mnemonics and pseudo code. The trampoline includes two areas of instructions for an instrumented system call, following a conditional jump, the check direction flag instruction at 507. A first area, at 587, replicates the borrowed instruction bytes 413, so the borrowed instruction is executed as if the bytes had not been overwritten by the jump-to-trampoline 417. A second area, following 507, applies instrumentation, such as invoking handler(s) before and/or after executing the instrumented system call 473, which has been relocated to the trampoline. Both areas of the trampoline are reached via a single entry point. The trampoline's code distinguishes between flows that reach the entry point by sensing a bit flag, which distinguishes between the sequential flow over the borrowed instruction and flow from the instrumented system call.

The flow in FIG. 5 illustrates the sequential flow, referred to above, which includes setting the direction flag, the STD mnemonic at 417. Flow down the stack of instructions executes the set direction flag then the jump-to-trampoline at 417. Following the arrow, flow proceeds to the trampoline entry point 507 for the instrumentation of system call 473. The entry point instruction 507 detects that the direction flag has been set and directs flow, along the arrow, to 587, and to clearing of the direction flag. Then, the relocated instruction 413 from the borrowed code space is executed. A jump back instruction at the bottom of the example trampoline directs the flow to the instruction following the borrowed code space, the cmp rsi, 30 mnemonic in this example. The sequential flow continues, interrupted only by setting the direction flag, jumping to the trampoline, detecting the flag set, and clearing the flag set, before the relocated instruction is executed and sequential flow continues down the instruction list. The alternative flow is illustrated in the next figure.

Figure 6:
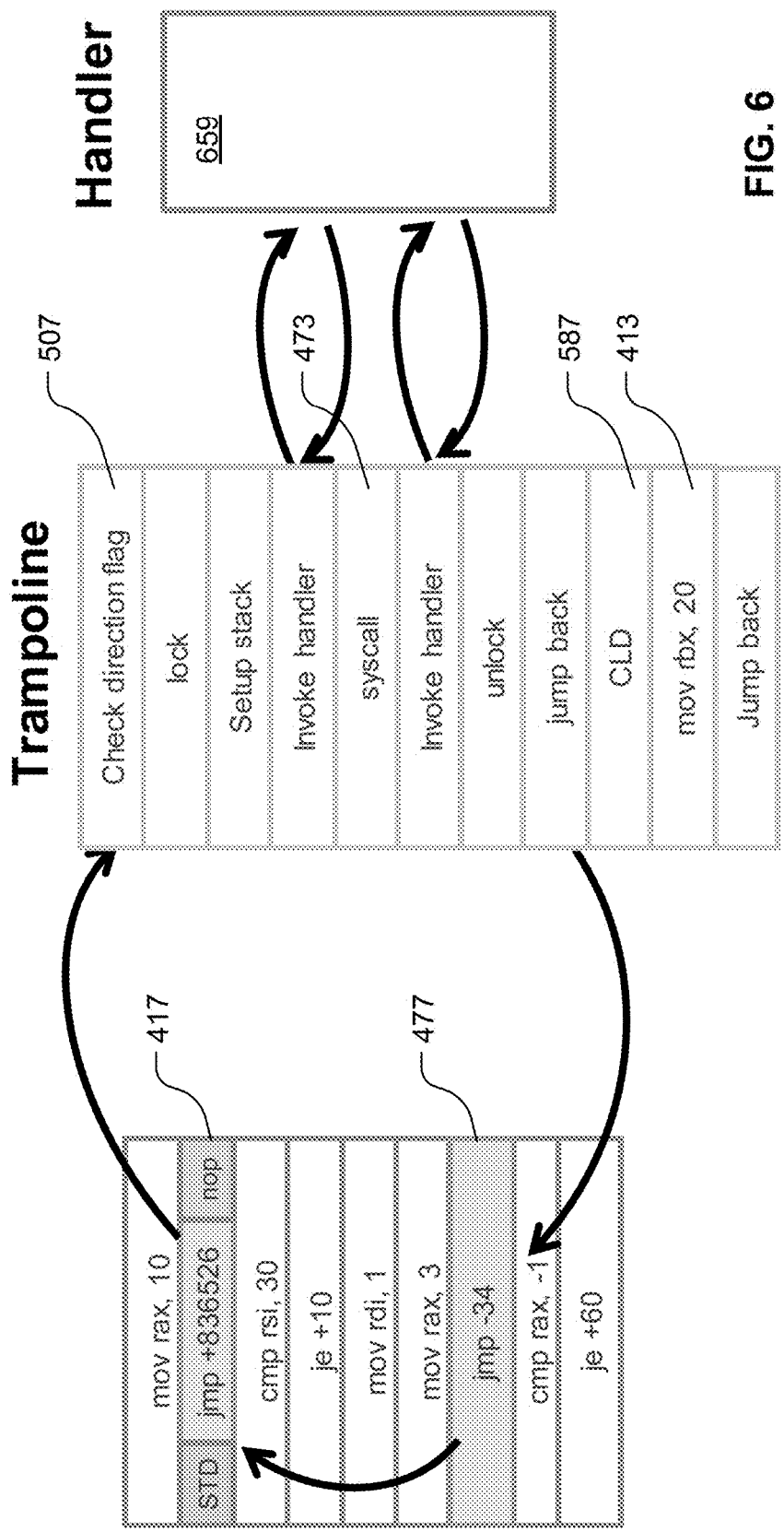
FIG. 6 illustrates an example flow for instrumentation.

The flow in FIG. 6 illustrates the instrumentation flow, which skips setting the direction flag. When the flow reaches the original location of the instrumented SYSCALL 473 instruction, it encounters a short jump instruction jmp −34, at 477. In this example, jmp has the same two byte instruction length as a SYSCALL. The flow takes a short jmp to the jump-to-trampoline instruction 417, without encountering the set direction flag instruction. The normal state of the direction flag is cleared, so it remains cleared after short jmp 477 and jump-to-trampoline 417 sequence. At the trampoline, the entry point instruction 507 detects that the direction flag has not been set and the flow continues down the instruction list. The blocks, in pseudo code, call for setup stack and invoke handler. Optionally, a system lock can be invoked, as explained below. Setting up the stack involves a subroutine call sequence. The currently active registers are saved, and handler parameters are set. The trampoline calls an on entry handler routine, which can be part of handler 659. On return from the handler, the trampoline restores the previously-saved registers (not separately shown). The trampoline invokes the system call. On return from system call, the trampoline again saves currently active registers and sets handler parameters. The trampoline calls an on_exit handler routine, also can be part of the handler 659 or can be part of a separate routine under management of the handler manager 372. On return from the on_exit handler routine, the trampoline restores the previously-saved registers. If only an on entry or on_exit handler routine is desired, the trampoline can be simplified.

Figure 18:
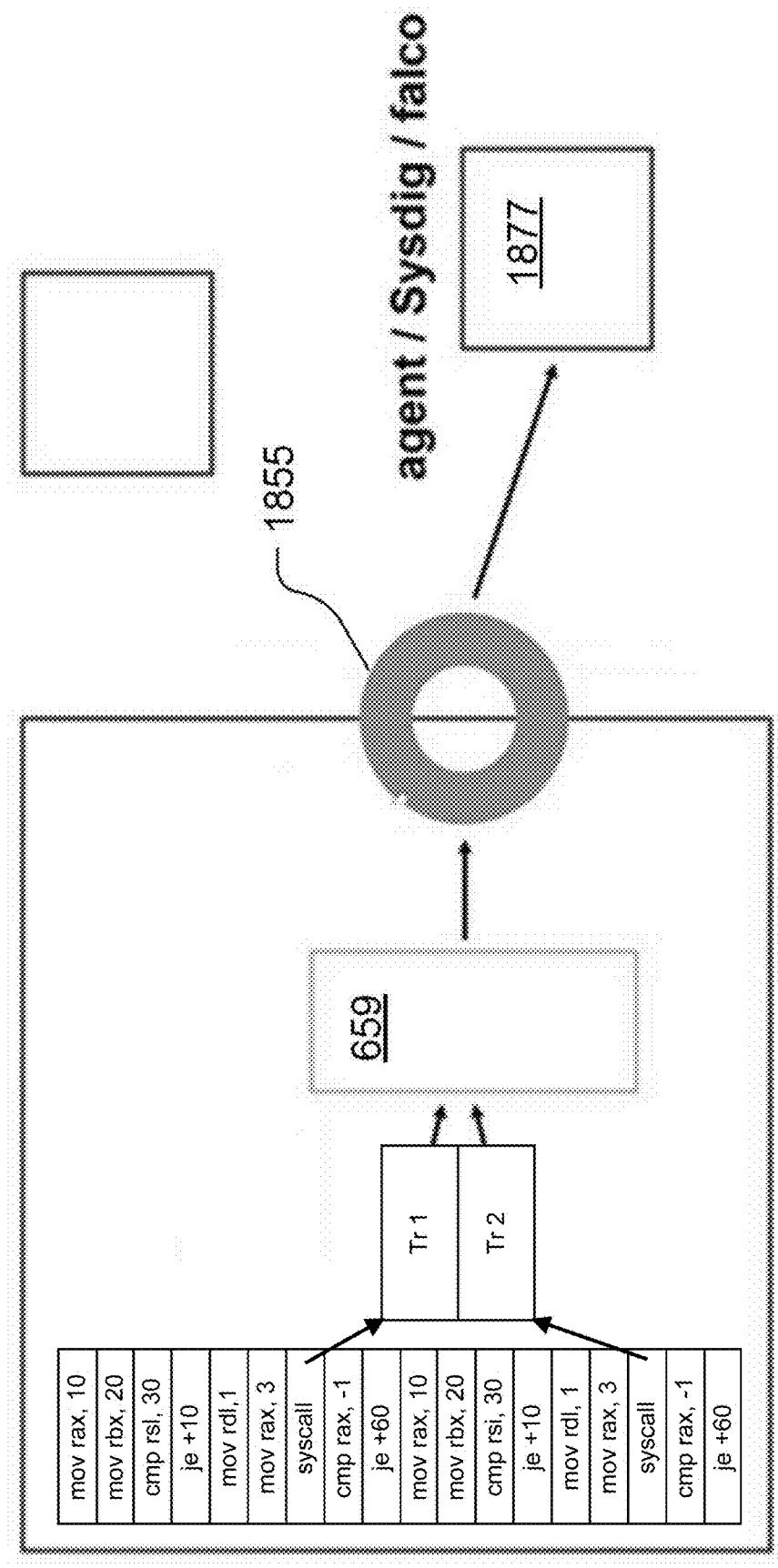
FIG. 18 illustrates a shared circular buffer accessible to an agent that aggregates instrumentation read outs.

In one implementation, the handlers use a shared buffer to deliver results to an agent outside the process memory that aggregate and report the results. FIG. 18 illustrates a shared circular buffer 1855 accessible to the agent 1877. In Linux, the SHM OPEN call can be used to allocate shared memory for such a buffer. The memory space can be named, to make it readily accessible to processes that know its name. The buffer can be circular, FIFO or some other design understood by the agent. Other message passing designs to communicate results from the handler within the process memory space to an agent outside the space also can be used. For instance, inter-process communications can be used or file buffer(s), using file(s) in either dynamic or persistent memory.

When a shared buffer is used, only one handler instance should be writing to it at a time. To handle concurrency, a spinlock or other locking mechanism, indicated in FIG. 6 by the lock and unlock pseudo code, can be used. In some implementations, a semaphore, mutex or adaptive mutex can be used.

A handler for instrumentation can be invoked before, after, or both before and after executing the relocated system or function call, with substantial practical benefits. One example of instrumentation is for container forensics and incident response. Container forensics help with understanding and containing the impact of any security breach, as part of incident response. Container forensics can help a company comply with requirements of data protection laws and security compliance policies. While container images are immutable, their execution runtime is not. Accordingly, the illustrated instruction swaps can be performed after pausing execution of a loaded container that is subject to forensic inspection. Another example application is troubleshooting of systems. System call visualization and detailed drill-downs are supported by instrumentation. Errors in system calls can be captured immediately after calls and matched with parameters of the calls. Processes, commands, file and network connections, errors, logs and other artifacts of a running system can be captured using instrumentation. In another example, visibility into container security can be improved by instrumentation. Gaining visibility across both monitoring and security data is a challenge for a cloud-native transformation journey. For instance, the security team may need to investigate whether cryptomining or a DOS attack can be further explained by an abnormal CPU metric spike. Similarly, the application performance team needs to be aware of the risk posture and potential vulnerabilities of their software applications. Instrumentation can be used to explore security threats that are manifest only during run time. Runtime visibility can be provided into virtual machines, cloud instances and containers, including file system activity, application protocols, container orchestration events and every system call.

In one embodiment, the instrumentation described is compatible with security policies that leverage the rule description language used by the Falco open source project. A user can browse an extensive library of default Falco rules, customize them and create new rules. Using Falco Rule Library, security ops teams can download and implement community-driven policies from the Rules Library (such as FIM, cryptojacking, MITRE, etc.). Instrumentation helps confirm that the rules are in operation and providing the protection The trampolines illustrated in FIGS. 5 and 6 are compact and require modest space for setting up invocations of the handler. It is useful to have a compact design for the trampoline, when there are two trampoline areas for each instrumented system call. The trampoline areas correspond to individual instrumented calls that have distinct return points.

Figure 7:
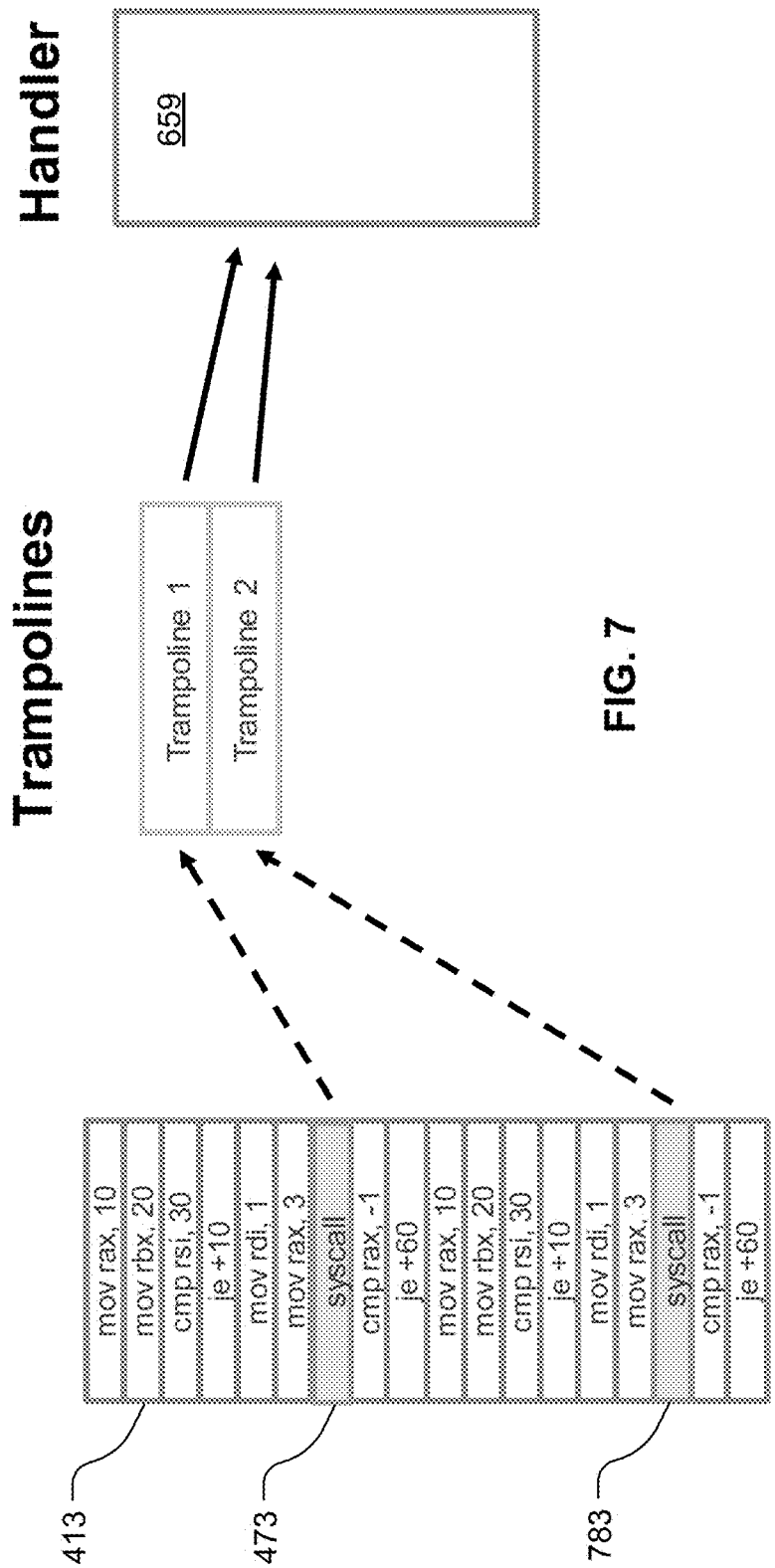
FIG. 7 illustrates system calls that have been instrumented to invoke, via multiple trampoline areas, a single handler.

FIG. 7 illustrates two system calls, SYSCALL 473 and SYSCALL 783, that have been instrumented to invoke, via multiple trampoline areas, a single handler 659. The two trampolines can both call the exact same on_entry and/or on_exit handler routine, which, in turn can be routines in the same handler. As FIGS. 4 and 6 depict, the instrumentation tool alters instructions in the source process executable. These alterations are not shown in this conceptual FIG. 7.

FIG. 8 illustrates the use of a debugger to attach handler(s) used for instrumentation. The handlers do not rely on dynamically linked libraries, which would complication detaching and unloading of instrumentation. Modern compilers afford two choices: support for dynamic linking, with a relocatable binary and symbols resolved at load time or static linking, with a binary loadable at a fixed address and symbols resolved before loading. It is preferable for the handlers and trampoline, which are loaded into the process space of the process being instrumented, to combine pre-loading symbol resolution and relocatable code addressing, to facilitate the loading into the process space. With symbol resolution, akin to static linking, the code space needed to accommodate the instrumentation is readily determined. The original address space of the source process binary can be enlarged to accommodate the instrumentation. With relocatable code, a small patch of code temporarily inserted into the code being instrumented can cause the instrumentation code to be loaded, without conflict over positions of modules within the source process address space.

The process of combining the instrumentation code with a source process binary depends, in part, on whether the process being instrumented is loaded and running when the investigation begins. As described above, a debugger can be used to establish a breakpoint for a source process that has not yet started running, before instrumentation. Also described above, an already running process can be frozen, e.g. using pTrace, and instrumented using the technology disclosed. In one implementation, a small patch of code temporarily inserted into the code being instrumented can cause the instrumentation code to be loaded, including extending the source process address space, if appropriate, loading the handler(s), building the trampoline(s) and provisioning space for an instrumentation heap and for communications with agent(s) outside the extended source process address space.

At the start of the flow, in FIG. 8, there is a named C program (referred to as process P) that implements part of the instrumentation tool. P has been compiled using gcc. In step 800, a person, program, or system runs P under the gdb debugger. In step 810, a person, program, or system sets a breakpoint at the entry to main( ) of P. In step 820 a person, program or system runs P until it reaches this particular breakpoint. In step 830 a person, program, or system causes gdb to take a snapshot of the running process P. The resulting snapshot has the desired characteristic of being self-contained but not having dependencies related to its base address. Accordingly, the snapshot can be used as an instrumentation tool. The debugger is stopping process P at the entry point of main, after the loader and P's initialization code have had a chance to configure its memory regions and perform its appropriate initializations. Using the debugger is just a means of executing the instrumentation tool, stopping it at the first instruction of main( ) and taking a snapshot of its entire memory. It will be apparent to those skilled in the art that all combinations of steps with actors (person, program, or system) are workable. It will also be apparent to those skilled in the art that there are many minor variants of this approach, as well as other similar ways to construct an instrumentation tool with the both dynamic and static characteristics.

FIGS. 9A and 9B show flows of the instrumentation tool attaching to and detaching from a source process executable. FIG. 9A illustrates the attachment steps and FIG. 9B illustrates the detachment steps.

Before carrying out the actions in FIG. 9A, the instrumentation tool identifies the source process and has available relocatable handlers that can be loaded in the address space of the source process being instrumented. Preferably, no dynamic linking is required by the handlers, when loaded. The instrumentation tool has root or other elevated privileges on the machine executing the source process, or whatever privileges are required to modify the memory of the source process to be instrumented.

The instrumentation tool starts with step 900, in which the instrumentation tool finds and pauses the source process to allow its state to be manipulated. In one embodiment, the instrumentation tool sends a SIGSTOP signal to the source process.

In step 910, the instrumentation tool attaches the handler to the stopped source process. In an embodiment, the instrumentation tool uses the "/proc/mem" interface to read and write the memory of the stopped source process. The steps required to attach a handler are further elaborated in FIG. 10. After the instrumentation tool has attached the handler, in step 920 the instrumentation tool resumes the source process. In one embodiment, the instrumentation tool sends a SIGCONT signal to the source process.

FIG. 9B illustrates how the instrumentation tool undoes the steps performed in FIG. 9A after the instrumentation is no longer needed. In step 930, the instrumentation tool finds and pauses the source process to allow its state to be manipulated. In one embodiment, the instrumentation tool sends a SIGSTOP signal to the source process. Step 930 may be identical in implementation to step 900, but may also differ. In step 940, the instrumentation tool detaches the handler and trampoline from the stopped source process. In an embodiment, the instrumentation tool uses the "/proc/mem" interface to read and write the memory of the stopped source process. After the instrumentation tool has detached the handler, in step 950 the instrumentation tool resumes the source process. In one embodiment, the instrumentation tool sends a SIGCONT signal to the source process. Step 950 may be identical in implementation to step 920, but may also differ.

FIGS. 10, 11A, 11B, and 12, in turn, show the steps involved in attaching handler(s), and is a more detailed description of step 910 in FIG. 9A. Before entering the flow of FIG. 10, the source process has been identified and stopped, and the instrumentation tool has sufficient privileges to manipulate all of the states of the source process. In step 1000, the instrumentation tool loads the handler(s) into the address space of the source process. This initial installation step only requires finding a base address for and copying the handler(s) into the source process, starting at that base address, then building the trampoline. The exact base address need not be known in advance, as it can be furnished as part of the result of a space allocation system call, such as mmap on a Linux system. The widespread use of 64-bit address spaces means that any source process will have unused address space available. There are multiple ways in which the instrumentation tool can find a suitably-sized unused portion of the address space. FIGS. 11A and 11B depict the situation before and after the loading of the handler(s).

Figure 12:
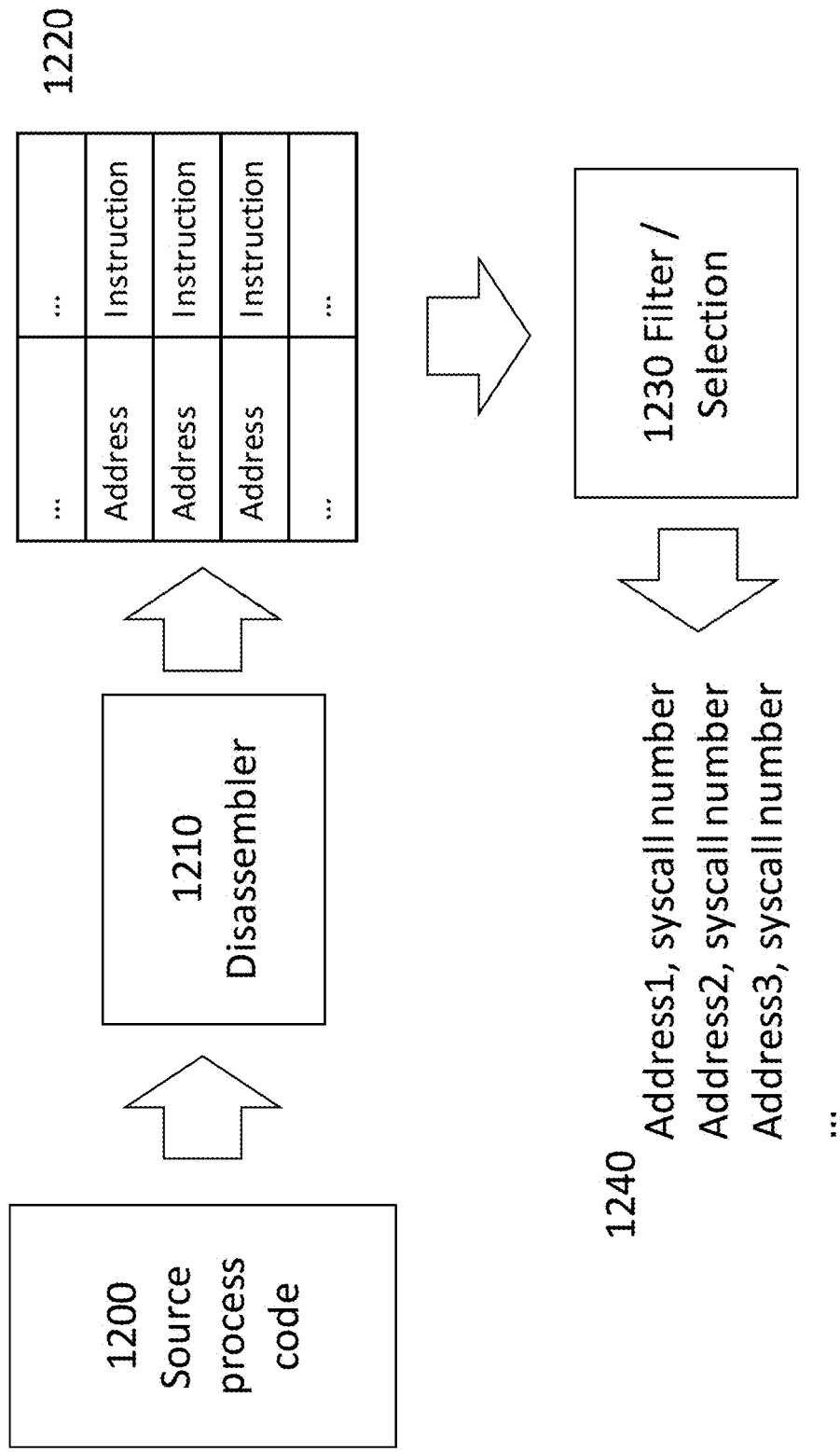
FIG. 12 illustrates example steps that can be used to find points of interest.

In step 1010, the instrumentation tool finds the points of interest in the source process. FIG. 12 further explains steps that can be used to find points of interest. In one embodiment, the points of interest are system calls. After the points of interest have been identified in step 1010, in step 1020 the instrumentation tool modifies the source process at or near each point of interest 1240. Each such modification serves to splice the handler(s) into the control flow of the source process. After the splicing, control flow that reaches the point of interest proceeds out to the handler(s) before proceeding onward, as it would have done before splicing. The splicing also ensures that control flow returns to the point of execution after the handler(s) has finished executing.

The part of the instrumentation tool that is loaded into the source process address space does not load additional modules or libraries, which allows restoring the source process address space and removing instrumentation to be accomplished by reversing the steps described above. First the instrumentation tool unsplices the handler(s) from the source process so that the original execution flow of the source process is restored. Individual instructions are restored to their pre-splice state. Then the instrumentation tool uninstalls its components from the source process by returning the relevant part of the address space to its previous condition. If memory was allocated to hold the handler(s), that memory is deallocated. Or if the handler(s) was originally installed in some part of the address space that was all zeros, this restoration requires only recording the base address and the size of the handler(s). Uninstallation then proceeds with zeroing out the memory of the source process starting at the recorded base address and proceeding for the size of the handler(s).

It is not necessary for all of step 1010 to be completed before step 1020 begin. Single points of interest or groups identified can be subsequently handled as finding proceeds. Similarly, it is not necessary for the splicings in step 1020 to be handled in the same order as the identifications of step 1010. All that is needed is to identify a point of interest before instrumenting it.

As splicing is performed, areas of the trampoline can be built, because borrowed instructions and return addresses become known. A sequential flow area of the trampoline is constructed to include a clear direction flag instruction, execution of instruction(s) copied from the borrowed code space, and a jump back to the source process. An instrumentation area of the trampoline is constructed to include instrumentation before and/or after the instrumented system call, and a jump back to the source process. The instrumentation is handled by setting up and executing call(s) to the handler(s). In some implementations, this includes saving registers before a call, setting parameters, invoking the handler, optionally receiving a return code, and restoring registers before proceeding. In one implementation, the trampoline is constructed using assembly language programming and the handler is written in C programming language. In this scenario, it is useful for the trampoline to set up a C-style parameter list that assists the handler in understanding parameters of the system call, which are often in registers, rather than as C-style parameters. This is useful in assuring that the system state for the system call and for return to the source process is exactly as it would be without interception.

FIG. 12 illustrates an example flow for implementing step 1010. In one implementation, points of interest are system calls on the Intel x86 architecture, using a SYSCALL instruction. Each system call instruction is an identifiable byte sequence (in the Intel x86 architecture, hexadecimal 0F05). One implementation would to treat every instance of this byte pattern as a point of interest, but this specific byte pattern may appear in data, without being a SYSCALL instruction. Accordingly, the instrumentation tool uses a disassembler 1210 to find points of interest. The source process code 1200 is input to the disassembler 1210. The disassembler output 1220 distinguishes instructions from data, as well as assigning addresses to instructions. Some of the identified instructions in disassembler output 1220 will be system call instructions. The disassembler output is then processed by a filtering/selection process 1230, which may be performed by a person, program, or system, or some combination thereof. The resulting points of interest 1240 can include all the system call instructions, with their addresses, or a subset of the system calls.

FIG. 13 illustrates an example flow for splicing code to instrument a single point of interest and redirecting flow to a trampoline at a known address. At the start of this flow: the trampoline entry address and the address of the point of interest address are known. The trampoline entry address is the point to which the execution flow should transfer, so that the handler can be invoked and instrument the system call. FIGS. 13 and 14 illustrate how the system call instruction is replaced with a jump sequence that will transfer flow to the handler entry address.

In most instruction sets, there are at least one short jump and at least one long jump instruction. A short jump occupies fewer bytes, due to a limited range of destination addresses, while a long jump occupies more bytes, allowing for specification of a larger range of destination addresses. In one embodiment, a short jump is only two bytes long while a long jump is five bytes long. For example, an Intel x86 architecture short jump has opcode EB and uses a single byte value as its relative jump position or offset.

Continuing the example of an Intel x86 architecture, the SYSCALL instruction is only two bytes. While it is not possible to replace the SYSCALL instruction with a five-byte long jump, it is possible to replace it with a two-byte short jump. However, a short jump supports only a jump offset of +/−127 from the current location. It is unlikely that a particular system call will be within 127 positions of the trampoline or handler entry point. Then multiple points of interest need to be instrumented, and they are likely to be more than 127 positions apart, so a sequence of jumps is useful, such as one short jump to reach a nearby long jump-to-trampoline, from which the handler is invoked.

The trampoline compensates for the changed or replaced instructions in the source process executable. A compact trampoline can be created specific to a point of interest to be instrumented (e.g. the selected SYSCALLs in the source process). The trampoline has two areas corresponding to being called from two different places: the point of interest system call and the suitable location for the jump-to-trampoline instruction space. As illustrated above, the trampoline can determine the flow preceding the entry point by sensing the direction flag. Depending on whether the flag is set, flow will return to a position after the system call or after the borrowed code space. When multiple flows branch to a single location on the trampoline, specific return addresses can be hardcoded for corresponding returns.

An area of the trampoline includes the borrowed instruction that was originally in the source process executable. This instruction was relocated to the trampoline to make room for the longer jump-to-trampoline instruction. When sequential flow reaches the borrowed location of the relocated instruction, the trampoline compensates and provides for execution of the instruction. This relocated instruction is potentially different for each point of interest, so relocating the instruction to the trampoline can be more efficient than other approaches, such as switching among possible relocated instructions.

The second instrumentation point jump, referred to as a long jump or jump-to-trampoline, can use 32-bit or 64-bit addressing field. A 32-bit address fits in a smaller instruction space and allows a jump of about +/−2 GB from the jump point. Use of a 32-bit address constrains the location at which an applicable trampoline is loaded.

As trampolines are created, instrumentation point jumps in the source process executable can be set to point to respective trampolines. The SYSCALL instructions at point of interest A can be replaced by short jumps to the corresponding jump-to-trampoline instructions, which are long jumps to corresponding trampolines.

In step 1300, the instrumentation tool searches for a suitable location, within range of the instrumented point of interest, at which to inject the jump-to-trampoline. When the search starts, at least the address of the point of interest is known and, potentially, the entry point to the trampoline. FIG. 14, discussed below, provides additional detail of step 1300. In step 1310, the search has either been successful or not. In step 1320, the search has been unsuccessful, and the instrumentation tool reports that it was unable to instrument the point of interest. Optionally, the instrumentation tool may terminate if it encounters an error at 1320. Normally, in step 1330, the search is successful and the instruction(s) at the location within a short jump of the system call is saved or recorded, to be relocated to the trampoline. In step 1340, the trampoline is constructed using the point of interest address, the system call at that address, the suitable, borrowed location address and the relocated instruction(s) from the borrowed address. In step 1350, the system call is overwritten by a short jump that starts the jump sequence, directed to the jump-to-trampoline instruction. In step 1360, the borrowed instruction is overwritten by the jump-to-trampoline, a long jump to a respective constructed trampoline. Although original instruction at the borrowed address is lost when overwritten in step 1360, the process's behavior is unchanged because the instruction is relocated to the trampoline. Note that the order among steps 1330-60 can vary.

FIG. 14 illustrates the steps that can be followed to find a suitable location to borrow, corresponding to step 1300 of FIG. 13. A suitable location can be a single instruction that is large enough to accommodate a long jump instruction, or a sequence of two or more instructions that are collectively large enough to accommodate a long jump instruction. On the Intel x86 architecture, the space required is six or more bytes, so the space borrowed can be a single six-plus byte instruction within range of a short jump from the instrumented system call. To find the space to borrow, in step 1400, a first location within range is examined for suitability. Preferably, the space is a single instruction. When a sequence of two or even three instructions is selected for replacement, there should not be any transfer from another section of code that lands in the middle of the instruction sequence. One potential consequence of jumping or branching into the middle of a borrowed instruction sequence would be an instruction exception, with the replacement instruction alignment being different than the original instruction alignment expected by the jump. Alternatively, the jump would bypass the flag setting instruction and be treated by the trampoline as if flow had proceeded from the system call location to the jump-to-trampoline instruction to the trampoline for execution. As a result, flow would return from the trampoline to the system call flow instead of the sequential processing flow, to the wrong place. Disassembling of source process code is able to detect whether any static jumps are directed to the instruction sequence under consideration for replacement, to be borrowed. This is not perfect, as destinations of computed jumps are unlikely to be decoded by disassembly. Other heuristics also can be applied to determine a suitable location for writing the flag setting and jump-to-trampoline instructions into the source process binary.

Step 1410 branches based on suitability of the location under consideration. Branch 1420 is reached upon finding a suitable space to borrow, which ends the search. Otherwise, at step 1430, either a next location is considered or an error 1450 results if there are no further locations to consider.

It is useful to select locations in a jump sequence leading to the jump-to-trampoline that are sequentially reached, not the target of a branch or jump from another location in the source process. The instrumentation tool can apply this criterion using the disassembler, which identifies all jumps seen in source process code. Still, disassembly is not guaranteed to find every possible jump, in the case of certain kinds of data-driven computed jumps. Accordingly, the jump-target information from the disassembler is treated as a heuristic to guide better or worse choices for suitable location to borrow. Another heuristic that can be applied is to favor instruction clusters that are immediately followed by jumps, since it is unusual for a process to jump to a location and then almost immediately jump again.

Again, there is a use case involving multiple short jumps, one short jump to another short jump, and so forth, leading eventually to a jump-to-trampoline long jump. If no large-enough suitable location is found 1320, 1450, it is possible to search instead for a next-best location address, large enough to accommodate a short jump in a chain. In principle, this usage of next-best addresses and short jumps may be repeated as many times as necessary, provided that flags are available to allow the trampoline to distinguish among flows leading to the trampoline. Depending on the context, additional flags may not be available. For example, the Intel x86 architecture has one flag that works particularly well, with short flag setting instructions, but has only one such flag.

FIG. 15 illustrates steps that can be taken to reverse instrumentation of the source process. Accordingly, FIG. 15 effectively reverses FIG. 10. In step 1500 the points of interest are identified. These points of interest may be recorded in a list or other data structure that was built previously, or they may be identified through dynamically inspecting the instrumented source process. In step 1510, each point of interest is restored to its previous condition, unsplicing the control flow. After step 1510 is complete, the process is restored to its original control flow and no point of interest diverts control flow to trampolines. Note that unsplicing control flow may include deallocating or overwriting trampolines that were previously constructed. In step 1520, instrumentation components are unloaded. As with the trampolines, this process of restoring the source process may involve deallocating or overwriting instrumentation code.

Multi-Threaded Instrumentation and Forking

In a single-threaded system, the instrumentation activity could simply load the instrumentation tool. But in a multi-threaded system the instrumentation activity might well find that multiple copies of the tool or handler had been loaded by different concurrently-executing threads. Ideally, the instrumentation activity would have an operating-system mechanism for freezing all the threads but one, which could then perform the task of interest (in this case, loading the tool or handler). Unfortunately, such a mechanism is missing in many operating systems. Instead, there is likely to be a means of freezing and unfreezing an entire (multithreaded) process, and a means of modifying the state of that process while it is frozen. Fortunately, those mechanisms are sufficient to construct a means of allowing only a single thread to execute. The instrumentation tool modifies all of the threads but one so that they do nothing. After the loading is finished, the instrumentation tool can undo this single-thread-running modification.

In an embodiment, the/proc/<pid>/mem interface does not produce current Instruction Pointers (InPtrs) for the executing threads; however, in that same embodiment a different interface (/proc/<pid>/SYSCALL) does produce current InPtrs. So, it is possible to instrument a frozen process by determining all of the InPtrs for all of the threads. The instrumentation tool inserts micro-trampolines in ALL of the threads, where the micro-trampoline for every thread except the one of interest simply causes it to wait.

Figure 16:
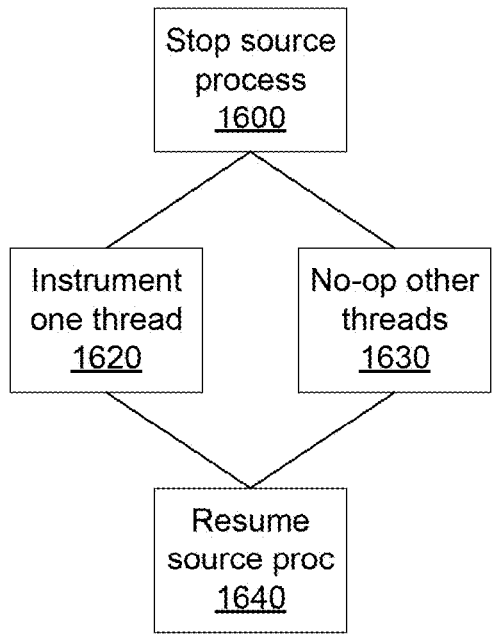
FIG. 16 illustrates how a single thread can be instrumented under an operating system that does not provide thread-level breakpoints, or where those capabilities are not being used.

FIG. 16 illustrates how a single thread can be instrumented under an operating system that does not provide thread-level breakpoints, or where those capabilities are not being used. The intended effect is to instrument a single thread. If one could selectively run a single thread of interest, implementation would be simplified. However, there most often is no means to run only one thread. Thus, the instrumentation tool instruments all of the threads, but in different ways. The single thread of interest is instrumented to run and to carry on activities that advance the goal of instrumenting the source process, such as loading the instrumentation tool or handler. Other threads, among the multiple threads, threads other than the one of interest, are instrumented in a way that causes them to simply wait. In step 1600, the process is stopped and examined to determine the number of threads and their current instruction pointers. In step 1610, a single thread is altered so as to cause it to load the instrumentation code. In step 1620, all of the other threads are altered so that they wait, or spin, or otherwise make no progress and do not compete against the single thread affected in step 1610. It will be apparent to those skilled in the art that steps 1610 and 1620 can be performed in any order, including simultaneously, since no single thread is involved in both steps. Whatever ordering happens with steps 1610 and 1620, step 1630 is not taken until both steps 1610 and 1620 have completed, that is all threads in the source process have been modified. In step 1630, the stopped process is resumed. Ordinarily a resumed process would cause an arbitrary thread or collection of threads to run, and indeed that may happen with the source process; but because of the modifications to all the threads but one, only a single thread will actually make progress.

Figure 17A:
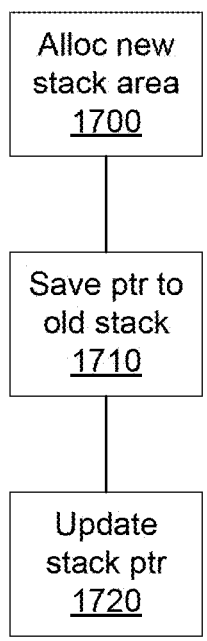
FIG. 17A illustrates how a separate stack area can be allocated and used for instrumentation routines, and later removed from service when no longer needed.
Figure 17B:
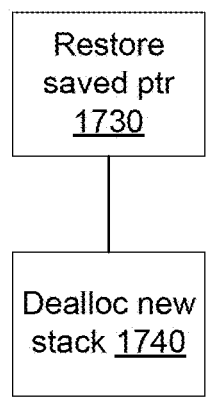
FIG. 17B illustrates how a separate stack area can be allocated and used for instrumentation routines, and later removed from service when no longer needed.

FIGS. 17A and 17B illustrate how a separate stack area can be allocated and used for instrumentation routines, and later removed from service when no longer needed. The stack management disclosed reduces the likelihood of exhausting available stack space of the source process. Most generally, an instrumentation tool may not know the stack layout of the source process. It follows that it does not know how much additional space is available on the source process stack. If the instrumentation tool exhausts the source process stack, there may be severe consequences. If the stack overflow is not detected, the instrumentation will silently corrupt data of the source process. If the stack overflow is detected but not correctly handled, the instrumentation will cause an abnormal end to the process, which also is undesirable.

FIG. 17A illustrates the instrumentation tool running with a new stack. In step 1700, a new stack area is allocated within the source process's address space, which may be an expanded address space. In step 1710, the current value of the stack pointer register (pointing to the source process's current stack) is saved. In step 1720, the stack pointer register is updated to point to the newly-allocated stack. Because of this change, subsequent calls add stack frames in the new stack and subsequent returns remove stack frames in the new stack. Because this is a newly-allocated area under the control of the instrumentation tool, there is no risk of overflowing the allocated stack space of the original source process and correspondingly no concern about potentially introducing inadvertent corruption or causing a segmentation violation. FIG. 17B illustrates the steps required to return to running source process code on its original stack. In step 1730, the stack pointer register is updated to point to the original source process stack. In step 1740, the newly-allocated stack is deallocated.

Another use case involves instrumenting a newly-spawned process. As described above, the instrumentation tool can stop a running process, manipulate its memory contents, and restart it. This approach effectively achieves the effect of ptrace without using ptrace—that is, it establishes a dynamic breakpoint mechanism without requiring the ptrace kernel facility. An extension of the technology disclosed is needed to instrument a newly-created, spawned process from an already instrumented source process.

Spawning a new process in Linux and similar operating systems can be accomplished using a sequence of two system calls, clone and EXECVE. The clone call creates a new process (the child) that is an exact copy of the original process (the parent) except for a value that allows both parent and child to determine which process they are. Sometimes the exact copy is actually shared between parent and child—there is no new copy created of the state, only a new executing entity—in which case parent and child are considered threads. The tricky case for instrumentation is where the new child process, which is also sometimes called a fork, does not share code with its parent. When instantiating a fork, the child process typically calls EXECVE to replace its code with the contents of another executable file. If there were no attention paid to forking, such an EXECVE would overwrite instrumentation of the child process and escape instrumentation because, after the EXECVE completes, the child process is running the code of an entirely different executable. The replacement executable becomes an uninstrumented process, unless it is instrumented upon instantiation.

At the point where the child process is calling EXECVE, it is still an exact copy of the parent and is accordingly still a version of the instrumented source process. The instrumentation can instrument the EXECVE system call itself, which will effectively intercept every attempt to create a different process. Instrumentation of the EXECVE can ensure that the instrumentation tool processes and instruments newly-loaded code by applying an on_exit handler following invocation of EXECVE. This can be done outside kernel space, in user space, using the mechanisms previously described. The disassembling identifies calls to EXECVE, overwrites the EXECVE to accomplish a jump-to-trampoline or a jump sequence culminating in a jump-to-trampoline. Because EXECVE requires long parameters, the adjacent relocatable instruction may directly precede the SYSCALL, obviating any need for either a short jump or flag setting and testing.

The first mechanism (loading and splicing) enables the instrumentation of any running process up to the point where it creates a new process. The second mechanism (instrumenting the EXECVE SYSCALL) enables the instrumentation to follow execution of interest, even when a new process is created. The combination of the two mechanisms broadens application of instrumentation to include tracking of child processes created by the originally-instrumented process.

Some Particular Implementations

Various implementations are described herein for instrumenting a source process executable that calls target processes, as opposed to instrumenting the target processes themselves. The technology disclosed can be practiced as a system, method, or article of manufacture. One or more features of an implementation can be combined with a base implementation. Implementations that are not mutually exclusive are taught to be combinable. One or more features of an implementation can be combined with other implementations. This disclosure periodically reminds the user of these options. In the interest of conciseness, alternative combinations of system features are not individually enumerated. Features applicable to systems, methods, and articles of manufacture are not repeated for each statutory class set of base features. Omission from some implementations of recitations that repeat these options should not be taken as limiting the combinations taught in the preceding sections—these recitations are hereby incorporated forward by reference into each of the following implementations.

One implementation the technology disclosed can be practiced as a method of instrumenting a source process that calls target processes. This method includes accessing a loaded but paused source process executable and disassembling the source process executable to identify at least some system calls to be instrumented and, for a respective system call, at least one adjacent relocatable instruction. Techniques are described for applying the method to a single respective system call, with the understanding that a plurality of system calls is instrumented. Instrumenting the respective system call includes building a trampoline for a respective system call that includes a check flag instruction at or near an entry point to the trampoline and two areas of the trampoline that are selectively executed according to results of the check flag instruction. Building a first area of the trampoline, in turn, includes providing instructions to execute a relocated copy of the adjacent relocatable instruction and return flow to an address immediately following the adjacent relocatable instruction. Building a second area of the trampoline includes providing instructions to invoke at least one handler before and/or after executing a relocated copy of the respective system call and return flow to an address immediately following the respective system call.

Instrumenting the respective system call further includes overwriting the respective system call and the adjacent relocatable instruction. The adjacent relocatable instruction his overwritten with at least a set flag instruction and a jump-to-trampoline instruction. The system call is overwritten with a jump instruction directed to the jump-to-trampoline instruction, forming a jump sequence that produces a different state of the flag when flow jumps from the system call than when flow proceeds sequentially to the jump-to-trampoline instruction. A variety of instruction sequences are available to produce different flag states depending on how the execution flow reaches the jump-to-trampoline instruction, which are reiterated below. Common to the alternative sequences, the jump-to-trampoline instruction is executed along both flow paths.

The method further includes causing execution of the source process executable with the trampoline operable to instrument the system calls. Results of instrumentation can be collected and can be filtered and/or aggregated for reporting to a user or a subsequent task in a workflow.

One or more of the following features can be combined with the immediately preceding method or any other method described in this disclosure. Nearly all of the features in the following section can be combined with each other, with the exception of mutually exclusive ways of using a flag, one of which sets the flag to indicate a sequential flow in the other which sets the flag to indicate a jump sequence.

The method disclosed can further include pausing the source process executable and making a copy of source process executable for disassembly.

Practicing the method disclosed, in some implementations, involves a first address of the at least one adjacent relocatable instruction is within a distance from a second address of the respective system call that is reachable by a jump instruction that takes no more code space than the respective system call that it replaces. In other words, the jump instruction has a code length in bytes that is less than or equal to a code length of instrumented system call. In some implementations, a code length in bytes of the adjacent relocatable instruction is sufficient to hold at least a set flag instruction and a jump-to-trampoline instruction. It also may include a jump instruction to bypass the set flag instruction in one flow, as described below.

The method disclosed can further involve the first area of the trampoline including a clear flag instruction that clears a flag that is set when the flow proceeds sequentially to the jump-to-trampoline instruction. Thus, the condition of the flag is restored upon return to a state that it had before it was encountered in the sequential flow.

The method disclosed can, alternatively, further include overwriting the adjacent relocatable instruction to include a short jump that bypasses the set instruction flag when the flow proceeds sequentially to the jump-to-trampoline instruction. Practicing this alternative, the jump sequence from the system call invokes the set flag instruction. The second area of the trampoline, as a corollary, includes a clear flag instruction that clears a flag set when the flow proceeds from the system call to the jump-to-trampoline instruction.

The method disclosed can further include loading the handler and the trampoline into a region of memory allocated to the source process code. As described a reference to the figures, this can involve expanding the allocated memory region.

As a feature of the trampoline, the instructions in the second area that invoke the handler further can include instructions that set a context for the handler to instrument the respective system call.

The system calls to be instrumented can be filtered based on instructions from a user. A user can select from among the types of system calls or locations of system calls to be instrumented. The selection can be made from a suggestion list and/or from a list of system call types identified by disassembly.

The instructions in the second area of the trampoline, which invoke the handler, can set with on entry parameters and invoke the handler before executing the system call, then set on exit parameters and again invoke the handler after executing the system call.

The method can further include collecting from the handler results of instrumentation and reporting the results to a user. It also can include pausing the source process executable, removing the instrumentation and restoring the system calls and the adjacent relocatable instructions, and resuming execution of the source process executable without the instrumentation.

In some implementations, selection of the adjacent relocatable instruction takes into account not including a contained address, within code space of the adjacent relocatable instruction, that is identified by the disassembling as a target of a jump or branch from another part of the source process executable. The whole area from the beginning of the adjacent relocatable instruction to the instrumented system call also can be qualified to not include an address identified by the disassembling as a target of the jump or branch from another part of the source process executable.

In some implementations, the source process executable is loaded on an Intel x86 processor and the system call is a SYSCALL instruction of an x86 instruction set.

Other implementations consistent with this method may include a non-transitory computer readable storage medium storing instructions executable by a processor to perform any of the methods described above. Yet another implementation may include a system with memory loaded from a computer readable storage medium with program instructions to perform the any of the methods described above. The system can be loaded from either a transitory or a non-transitory computer readable storage medium.

Each of the features discussed in the particular implementations section, above, for the first method implementation apply equally to the following second method implementation. As indicated above, not all the method features are repeated here, but should, nonetheless, be considered repeated by reference.

A second method implementation of the technology disclosed involves a source process that calls target processes. This method includes pausing execution of a source process executable and disassembling the source process executable to identify at least some system calls to be instrumented and, for a respective system call, at least one adjacent relocatable instruction that is within a short jump distance from the respective system call and that occupies sufficient bytes of executable code space to hold at least a set flag instruction and a jump-to-trampoline instruction. Instrumenting the respective system call uses an executable object code trampoline to invoke one or more handlers, an includes building the trampoline, relocating the respective system call and the adjacent relocatable instruction to the trampoline, and overwriting the system call and the adjacent relocatable instruction with a sequence of jump instructions.

Building the trampoline for a respective system call and relocating instructions, in turn, includes providing a check flag instruction at or near an entry point to the trampoline and providing two areas of the trampoline that are selectively executable depending on results of the check flag instruction. A first area of the trampoline, executed responsive to a first state of a flag, includes at least a relocated copy of the adjacent relocatable instruction and a first jump instruction that returns flow to an address immediately following the adjacent relocatable instruction in the source process executable. A second area of the trampoline, executed responsive to a second state of the flag, includes at least instructions that invoke a handler before and/or after executing a relocated copy of the respective system call, an instruction that executes the relocated system call, and a second jump instruction that returns flow to an address immediately following the respective system call in the source process executable. Depending on usage of the flag, either the first area or the second area includes a flag reset instruction that changes the flag between the first state and the second state.

Overwriting the respective system call and the adjacent relocatable instruction include overwriting the adjacent relocatable instruction with at least the set flag instruction and the jump-to-trampoline instruction and overwriting the system call with a short jump instruction directed to the jump-to-trampoline instruction, in a jump sequence that produces a different state of the flag when flow jumps from the system call than when flow proceeds sequentially to the jump-to-trampoline instruction.

The second method further includes causing execution of the source process executable with the trampoline operable to instrument the system calls.

Each of the features discussed in the particular implementation section for the first method implementation apply equally to this second method implementation. As indicated above, all the features not repeated here should be considered repeated by reference.

The technology disclosed also can be practiced as a computer readable medium, loaded with computer program instructions that, when executed on one or more processors, cause the processors to carry out a method of instrumenting a source process that calls target processes. The method carried out can be either of the methods described in the particular implementation section, above, or any other method found in this disclosure. Some or all of the features described in the particular implementation section, above, can be combined with the base computer readable medium the technology, except that mutually exclusive alternative uses of the flag cannot be combined.

The technology disclosed also can be practiced as a system including at least one processor and memory coupled to the processor, the memory loaded with computer program instructions that, when executed on the processor, cause the processor to carry out any of the disclosed methods of instrumenting the source process. More particularly, systems are disclosed include memory loaded with program instructions from the computer readable medium implementation of the technology disclosed.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 19:
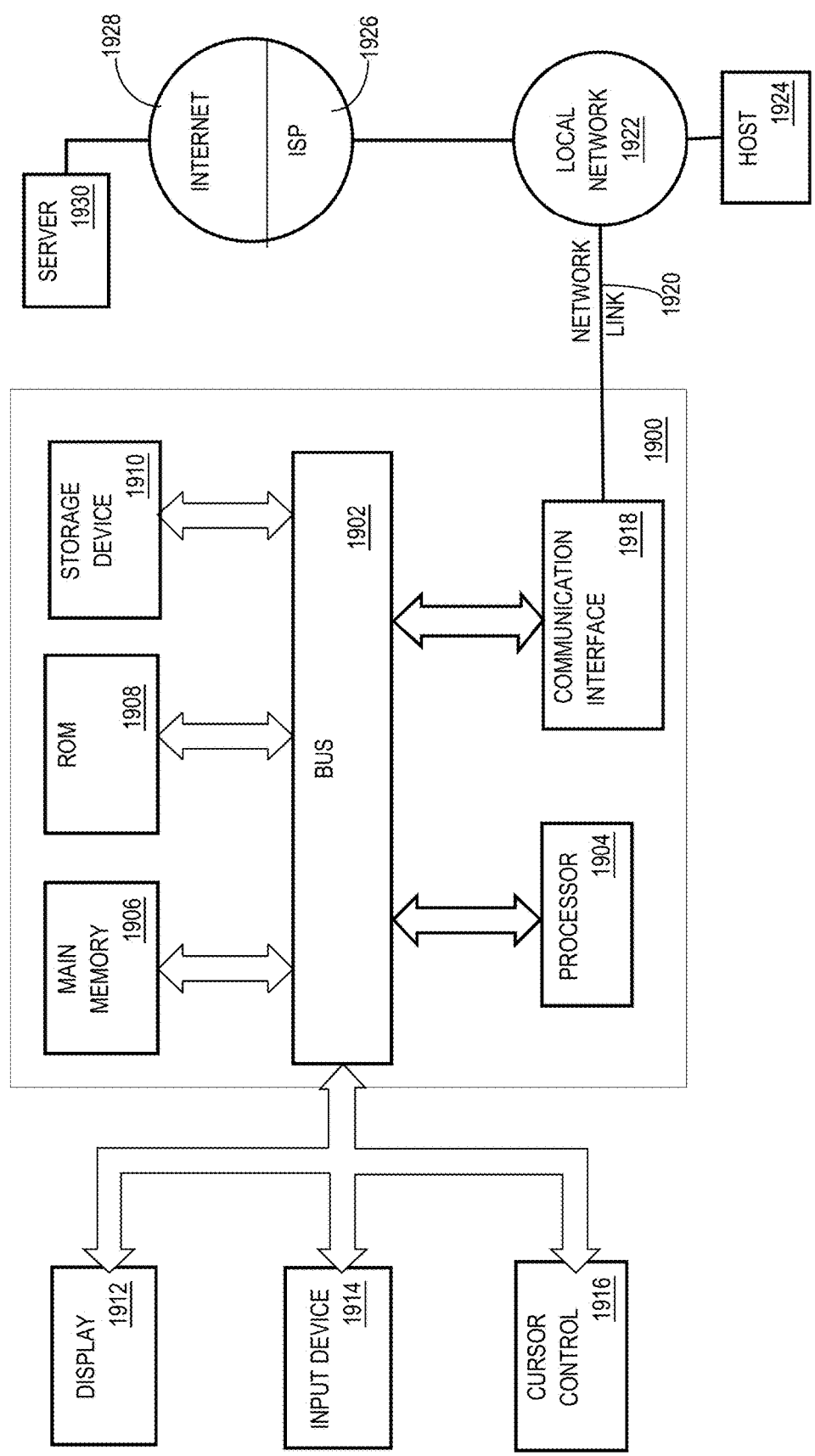
FIG. 19 is a block diagram of a computer system on which embodiments of the invention may be implemented.

FIG. 19 is a block diagram that illustrates an example computer system with which an embodiment may be implemented. In the example of FIG. 19, a computer system 1900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1900 includes an input/output (I/O) subsystem 1902 which may include a bus and/or other communication mechanism(s) for communicating information and/or instructions between the components of the computer system 1900 over electronic signal paths. The I/O subsystem 1902 may include an I/O controller, a memory controller and at least one I/O port. The electronic signal paths are represented schematically in the drawings, for example as lines, unidirectional arrows, or bidirectional arrows.

At least one hardware processor 1904 is coupled to I/O subsystem 1902 for processing information and instructions. Hardware processor 1904 may include, for example, a general-purpose microprocessor or microcontroller and/or a special-purpose microprocessor such as an embedded system or a graphics processing unit (GPU) or a digital signal processor or ARM processor. Processor 1904 may comprise an integrated arithmetic logic unit (ALU) or may be coupled to a separate ALU.

Computer system 1900 includes one or more units of memory 1906, such as a main memory, which is coupled to I/O subsystem 1902 for electronically digitally storing data and instructions to be executed by processor 1904. Memory 1906 may include volatile memory such as various forms of random-access memory (RAM) or other dynamic storage device. Memory 1906 also may be used for storing temporary variables or other intermediate information during execution of instructions to be executed by processor 1904. Such instructions, when stored in non-transitory computer-readable storage media accessible to processor 1904, can render computer system 1900 into a special-purpose machine that is customized to perform the operations specified in the instructions.

Computer system 1900 further includes non-volatile memory such as read only memory (ROM) 1908 or other static storage device coupled to I/O subsystem 1902 for storing information and instructions for processor 1904. The ROM 1908 may include various forms of programmable ROM (PROM) such as erasable PROM (EPROM) or electrically erasable PROM (EEPROM). A unit of persistent storage 1910 may include various forms of non-volatile RAM (NVRAM), such as FLASH memory, or solid-state storage, magnetic disk or optical disk such as CD-ROM or DVD-ROM, and may be coupled to I/O subsystem 1902 for storing information and instructions. Storage 1910 is an example of a non-transitory computer-readable medium that may be used to store instructions and data which when executed by the processor 1904 cause performing computer-implemented methods to execute the techniques herein.

The instructions in memory 1906, ROM 1908 or storage 1910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1900 may be coupled via I/O subsystem 1902 to at least one output device 1912. In one embodiment, output device 1912 is a digital computer display. Examples of a display that may be used in various embodiments include a touch screen display or a light-emitting diode (LED) display or a liquid crystal display (LCD) or an e-paper display. Computer system 1900 may include other type(s) of output devices 1912, alternatively or in addition to a display device. Examples of other output devices 1912 include printers, ticket printers, plotters, projectors, sound cards or video cards, speakers, buzzers or piezoelectric devices or other audible devices, lamps or LED or LCD indicators, haptic devices, actuators or servos.

At least one input device 1914 is coupled to I/O subsystem 1902 for communicating signals, data, command selections or gestures to processor 1904. Examples of input devices 1914 include touch screens, microphones, still or video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1916, which may perform cursor control or other automated control functions such as navigation in a graphical interface on a display screen, alternatively or in addition to input functions. Control device 1916 may be a touchpad, a mouse, a trackball, or cursor direction keys for communicating direction information and command selections to processor 1904 and for controlling cursor movement on display 1912. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 1914 may include a combination of multiple different input devices, such as a video camera and a depth sensor.

In another embodiment, computer system 1900 may comprise an internet of things (IoT) device in which one or more of the output device 1912, input device 1914, and control device 1916 are omitted. Or, in such an embodiment, the input device 1914 may comprise one or more cameras, motion detectors, thermometers, microphones, seismic detectors, other sensors or detectors, measurement devices or encoders and the output device 1912 may comprise a special-purpose display such as a single-line LED or LCD display, one or more indicators, a display panel, a meter, a valve, a solenoid, an actuator or a servo.

When computer system 1900 is a mobile computing device, input device 1914 may comprise a global positioning system (GPS) receiver coupled to a GPS module that is capable of triangulating to a plurality of GPS satellites, determining and generating geo-location or position data such as latitude-longitude values for a geophysical location of the computer system 1900. Output device 1912 may include hardware, software, firmware and interfaces for generating position reporting packets, notifications, pulse or heartbeat signals, or other recurring data transmissions that specify a position of the computer system 1900, alone or in combination with other application-specific data, directed toward host 1924 or server 1930.

Computer system 1900 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1900 in response to processor 1904 executing at least one sequence of at least one instruction contained in main memory 1906. Such instructions may be read into main memory 1906 from another storage medium, such as storage 1910. Execution of the sequences of instructions contained in main memory 1906 causes processor 1904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1910. Volatile media includes dynamic memory, such as memory 1906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1902. Transmission media can also take the form of acoustic or light waves, such as those generated during radio-wave and infra-red data communications.

Various forms of media may be involved in carrying at least one sequence of at least one instruction to processor 1904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1900 can receive the data on the communication link and convert the data to a format that can be read by computer system 1900. For instance, a receiver such as a radio frequency antenna or an infrared detector can receive the data carried in a wireless or optical signal and appropriate circuitry can provide the data to I/O subsystem 1902 such as place the data on a bus. I/O subsystem 1902 carries the data to memory 1906, from which processor 1904 retrieves and executes the instructions. The instructions received by memory 1906 may optionally be stored on storage 1910 either before or after execution by processor 1904.

Computer system 1900 also includes a communication interface 1918 coupled to bus 1902. Communication interface 1918 provides a two-way data communication coupling to network link(s) 1920 that are directly or indirectly connected to at least one communication networks, such as a network 1922 or a public or private cloud on the Internet. For example, communication interface 1918 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1922 broadly represents a local area network (LAN), wide-area network (WAN), campus network, internetwork or any combination thereof. Communication interface 1918 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1918 sends and receives electrical, electromagnetic or optical signals over signal paths that carry digital data streams representing various types of information.

Network link 1920 typically provides electrical, electromagnetic, or optical data communication directly or through at least one network to other data devices, using, for example, satellite, cellular, Wi-Fi, or BLUETOOTH technology. For example, network link 1920 may provide a connection through a network 1922 to a host computer 1924.

Furthermore, network link 1920 may provide a connection through network 1922 or to other computing devices via internetworking devices and/or computers that are operated by an Internet Service Provider (ISP) 1926. ISP 1926 provides data communication services through a world-wide packet data communication network represented as internet 1928. A server computer 1930 may be coupled to internet 1928. Server 1930 broadly represents any computer, data center, virtual machine or virtual computing instance with or without a hypervisor, or computer executing a containerized program system such as DOCKER or KUBERNETES. Server 1930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1900 and server 1930 may form elements of a distributed computing system that includes other computers, a processing cluster, server farm or other organization of computers that cooperate to perform tasks or execute applications or services. Server 1930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1930 may comprise a web application server that hosts a presentation layer, application layer and data storage layer such as a relational database system using structured query language (SQL) or no SQL, an object store, a graph database, a flat file system or other data storage.

Computer system 1900 can send messages and receive data and instructions, including program code, through the network(s), network link 1920 and communication interface 1918. In the Internet example, a server 1930 might transmit a requested code for an application program through Internet 1928, ISP 1926, local network 1922 and communication interface 1918. The received code may be executed by processor 1904 as it is received, and/or stored in storage 1910, or other non-volatile storage for later execution.

The invention claimed is:

1. A method of instrumenting a source process that calls target processes, comprising:
    accessing a loaded but paused source process executable;
    disassembling the source process executable to identify one or more system calls to be instrumented and, for a respective system call of the one or more system calls, an adjacent relocatable instruction;
    wherein a first address of the adjacent relocatable instruction is within a distance from a second address of the respective system call that is reachable by a given jump instruction;
    instrumenting the respective system call, wherein instrumenting the respective system call comprises:
        building a trampoline for the respective system call, the trampoline comprising a check flag instruction and two areas of the trampoline that are selectively executed according to results of the check flag instruction, the two areas of the trampoline comprising:
            a first area of the trampoline comprising instructions to execute a relocated copy of the adjacent relocatable instruction and return flow to an address immediately following the adjacent relocatable instruction, and
            a second area of the trampoline comprising instructions to invoke a handler in association with executing a relocated copy of the respective system call and return flow to an address immediately following the respective system call;
        overwriting the adjacent relocatable instruction with at least a set flag instruction and a jump-to-trampoline instruction; and
        overwriting the respective system call with a jump instruction that is directed to the jump-to-trampoline instruction, thereby forming a jump sequence that produces a different state of a flag when flow jumps from the respective system call than when flow proceeds sequentially to the jump-to-trampoline instruction;
    causing execution of the source process executable with the trampoline operable to instrument the one or more system calls.

2. The method of claim 1, further comprising pausing the source process executable and creating a copy of the source process executable for disassembly.

3. The method of claim 1, wherein the given jump instruction is of a code length in bytes that is less than or equal to a code length of the respective system call.

4. The method of claim 1, wherein a code length in bytes of the adjacent relocatable instruction is sufficient to hold at least a set flag instruction and a jump-to-trampoline instruction.

5. The method of claim 1, further comprising:
    the first area of the trampoline comprising a clear flag instruction that clears a flag that is set when the flow proceeds sequentially to the jump-to-trampoline instruction.

6. The method of claim 1, further comprising:
    overwriting the adjacent relocatable instruction with a short jump that bypasses the set flag instruction when the flow proceeds sequentially to the jump-to-trampoline instruction;
    invoking, by the jump sequence from the respective system call, the set flag instruction; and
    wherein the second area of the trampoline includes a clear flag instruction that clears a flag that is set when the flow proceeds sequentially to the jump-to-trampoline instruction.

7. The method of claim 1, further comprising:
    loading the handler and the trampoline into a region of memory allocated to the source process.

8. The method of claim 1, wherein the instructions in the second area of the trampoline further include instructions configured to set a context for the handler to instrument the respective system call.

9. The method of claim 1, wherein the one or more system calls to be instrumented are filtered based on instructions that are received from a user.

10. The method of claim 1, the second area of the trampoline further comprising instructions that:
    invoke the handler with on entry parameters before executing the respective system call and invoke the handler with on exit parameters after executing the respective system call.

11. The method of claim 1, further comprising:
    collecting, from the handler, results associated with instrumenting the one or more system calls;
    reporting the results to a user.

12. The method of claim 1, further comprising:
    pausing the source process executable;
    removing the instrumentation of the respective system call;
    restoring the respective system call and the adjacent relocatable instruction;
    resuming execution of the source process executable without the instrumentation.

13. The method of claim 1, wherein the adjacent relocatable instruction does not include a contained address within code space of the adjacent relocatable instruction that is identified by the disassembling as a target of a jump or a branch from another part of the source process executable.

14. The method of claim 1, wherein the source process executable is loaded on an Intel x86 processor and the respective system call is a SYSCALL instruction.

15. A system including at least one processor and memory coupled to the processor, the memory loaded with computer program instructions that, when executed on the at least one processor, cause the at least one processor to carry out a method of instrumenting a source process that calls target processes, comprising:

pausing execution of a source process executable;

disassembling the source process executable to identify one or more system calls to be instrumented and, for a respective system call of the one or more system calls, an adjacent relocatable instruction that is within a short jump distance from the respective system call and that occupies sufficient bytes of executable code space to hold at least a set flag instruction and a jump-to-trampoline instruction;

instrumenting the respective system call using an executable object code trampoline to invoke one or more handlers, wherein instrumenting the respective system call includes:

building the executable object code trampoline for the respective system call, the executable object code trampoline comprising a check flag instruction at or near an entry point to the executable object code trampoline and two areas of the executable object code trampoline that are selectively executable depending on results of the check flag instruction, the two areas comprising:

a first area of the executable object code trampoline that is executed responsive to a first state of a flag that includes at least a relocated copy of the adjacent relocatable instruction and a first jump instruction that returns flow to an address immediately following the adjacent relocatable instruction in the source process executable, a second area of the executable object code trampoline that is executed responsive to a second state of the flag that includes at least instructions that invoke a handler in association with executing a relocated copy of the respective system call, an instruction that executes the relocated copy of the respective system call, and a second jump instruction that returns flow to an address immediately following the respective system call in the source process executable, and wherein either the first area or the second area includes a flag reset instruction that changes the flag between the first state and the second state;

relocating the respective system call and the adjacent relocatable instruction to the executable object code trampoline, and overwriting the respective system call and the adjacent relocatable instruction with a sequence of jump instructions, comprising:

overwriting the adjacent relocatable instruction with at least the set flag instruction and the jump-to-trampoline instruction, and overwriting the respective system call with a short jump instruction directed to the jump-to-trampoline instruction thereby forming a jump sequence that produces a different state of the flag when flow jumps from the respective system call than when flow proceeds sequentially to the jump-to-trampoline instruction;

causing execution of the source process executable with the executable object code trampoline operable to instrument the one or more system calls.

16. A non-transitory computer readable medium, loaded with computer program instructions that, when executed on one or more processors, cause the processors to carry out a method of instrumenting a source process that calls target processes, the method comprising:

accessing a loaded but paused source process executable;

disassembling the source process executable to identify one or more system calls to be instrumented and, for a respective system call of the one or more system calls, an adjacent relocatable instruction, wherein a first address of the adjacent relocatable instruction is within a distance from a second address of the respective system call that is reachable by a given jump instruction;

instrumenting the respective system call, wherein instrumenting the respective system call includes:

building a trampoline for the respective system call, the trampoline comprising a check flag instruction and two areas of the trampoline that are selectively executed according to results of the check flag instruction, the two areas of the trampoline comprising:

a first area of the trampoline comprising instructions to execute a relocated copy of the adjacent relocatable instruction and return flow to an address immediately following the adjacent relocatable instruction, and a second area of the trampoline comprising instructions to invoke a handler in association with executing a relocated copy of the respective system call and return flow to an address immediately following the respective system call;

overwriting the adjacent relocatable instruction with at least a set flag instruction and a jump-to-trampoline instruction;

overwriting the respective system call with a jump instruction that is directed to the jump-to-trampoline instruction thereby forming a jump sequence that produces a different state of a flag when flow jumps from the respective system call than when flow proceeds sequentially to the jump-to-trampoline instruction;

causing execution of the source process executable with the trampoline operable to instrument the one or more system calls.

17. The non-transitory computer readable medium of claim 16, wherein the first area of the trampoline includes a clear flag instruction that clears a flag set when the flow proceeds sequentially to the jump-to-trampoline instruction.

18. The non-transitory computer readable medium of claim 16, the method further comprising:

overwriting the adjacent relocatable instruction with a short jump that bypasses the set flag instruction when the flow proceeds sequentially to the jump-to-trampoline instruction;

invoking, by the jump sequence from the respective system call, the set flag instruction; and wherein the second area of the trampoline includes a clear flag instruction that clears a flag that is set when the flow proceeds sequentially to the jump-to-trampoline instruction.

19. The non-transitory computer readable medium of claim 16, the method further comprising:

loading the handler and the trampoline into a region of memory allocated to the source process.

20. The non-transitory computer readable medium of claim 16, wherein the instructions in the second area that invoke the handler further include instructions that set a context for the handler to instrument the respective system call.

\* \* \* \* \*